(12) United States Patent
Islam et al.

(10) Patent No.: US 11,310,013 B2
(45) Date of Patent: *Apr. 19, 2022

(54) CSI-RS DESIGN WITH DYNAMIC SUBFRAME STRUCTURE

(71) Applicant: QUALCOMM Incorporated, San Diego, CA (US)

(72) Inventors: Muhammad Nazmul Islam, Littleton, MA (US); Tao Luo, San Diego, CA (US); Sundar Subramanian, San Diego, CA (US); Bilal Sadiq, Basking Ridge, NJ (US); Juergen Cezanne, Ocean Township, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 16/672,411

(22) Filed: Nov. 1, 2019

(65) Prior Publication Data
US 2020/0067672 A1 Feb. 27, 2020

Related U.S. Application Data

(63) Continuation of application No. 15/372,916, filed on Dec. 8, 2016, now Pat. No. 10,511,421.

(Continued)

(51) Int. Cl.
*H04L 5/00* (2006.01)
*H04W 72/04* (2009.01)

(52) U.S. Cl.
CPC .......... *H04L 5/0048* (2013.01); *H04L 5/0053* (2013.01); *H04L 5/0094* (2013.01); *H04W 72/0446* (2013.01)

(58) Field of Classification Search
CPC combination set(s) only.
See application file for complete search history.

(56) References Cited

U.S. PATENT DOCUMENTS 9,456,358 B2 9/2016 Chen et al.
2005/0201296 A1 9/2005 Vannithamby et al.
(Continued)

FOREIGN PATENT DOCUMENTS

CN 102740447 A 10/2012
CN 103684676 A 3/2014
(Continued)

OTHER PUBLICATIONS

International Search Report and Written Opinion—PCT/US2017/028713—ISA/EPO—Jul. 21, 2017.

*Primary Examiner* — Xavier S Wong
(74) *Attorney, Agent, or Firm* — Holland & Hart LLP/Qualcomm

(57) ABSTRACT

Methods, systems, and devices for wireless communication are described. A base station and user equipment (UE) may use subframe configurations that include dynamically scheduled channel state information reference signal (CSI-RS) symbols. For example, a base station may identify a subframe configuration that includes one or more sets of CSI-RS symbols of a subframe. The base station may indicate to a UE whether sets of CSI-RS symbols may be enabled or disabled during the subframe. The UE may receive multiple CSI-RSs at different locations within the subframe as indicated by the base station, and transmit CSI feedback to the base station based on at least one of the received CSI-RSs. In some examples, multiple base stations may coordinate the use of subframe configurations that include CSI-RS symbols that may be enabled or disabled.

30 Claims, 16 Drawing Sheets

Related U.S. Application Data

(60) Provisional application No. 62/338,500, filed on May 18, 2016.

(56) References Cited

U.S. PATENT DOCUMENTS

| | | | |
|---|---|---|---|
| 2011/0244877 A1 | 10/2011 | Farajidana et al. | |
| 2012/0058791 A1 | 3/2012 | Bhattad et al. | |
| 2012/0243500 A1 | 9/2012 | Chandrasekhar et al. | |
| 2012/0264441 A1* | 10/2012 | Chandrasekhar | H04L 5/0073 455/450 |
| 2013/0089065 A1 | 4/2013 | Koorapaty et al. | |
| 2013/0196699 A1 | 8/2013 | Davydov et al. | |
| 2013/0208669 A1 | 8/2013 | Pan et al. | |
| 2014/0198675 A1* | 7/2014 | He | H04L 5/14 370/252 |
| 2014/0247749 A1 | 9/2014 | Kim et al. | |
| 2014/0307820 A1 | 10/2014 | Chen et al. | |
| 2015/0043673 A1* | 2/2015 | Lee | H04B 7/0469 375/267 |
| 2015/0236801 A1 | 8/2015 | Sun et al. | |
| 2015/0256312 A1 | 9/2015 | Yi et al. | |
| 2015/0312927 A1 | 10/2015 | Ko et al. | |
| 2015/0327287 A1 | 11/2015 | Kim et al. | |
| 2016/0105817 A1 | 4/2016 | Frenne et al. | |
| 2016/0128029 A1 | 5/2016 | Yang et al. | |
| 2016/0227519 A1* | 8/2016 | Nimbalker | H04W 72/042 |
| 2016/0233995 A1 | 8/2016 | Wang et al. | |
| 2016/0277954 A1* | 9/2016 | Frenne | H04B 7/0626 |
| 2017/0195033 A1* | 7/2017 | Zhang | H04B 17/309 |
| 2017/0201899 A1 | 7/2017 | Guan et al. | |
| 2017/0338924 A1 | 11/2017 | Islam et al. | |
| 2019/0029052 A1 | 1/2019 | Yang et al. | |
| 2019/0349964 A1* | 11/2019 | Liou | H04W 72/046 |

FOREIGN PATENT DOCUMENTS

| | | |
|---|---|---|
| KR | 101619446 B1 | 5/2016 |
| WO | WO-2011115421 A2 | 9/2011 |
| WO | WO-2014028346 A2 | 2/2014 |
| WO | WO-2014121845 A1 | 8/2014 |
| WO | WO-2016056980 A1 | 4/2016 |

* cited by examiner

US 11,310,013 B2

CSI-RS DESIGN WITH DYNAMIC SUBFRAME STRUCTURE

CROSS REFERENCES

The present Application for Patent is a continuation of U.S. patent application Ser. No. 15/372,916 by Islam, et al., entitled, "CSI-RS Design With Dynamic Subframe Structure" filed Dec. 8, 2016, which claims priority to U.S. Provisional Patent Application No. 62/338,500 by Islam, et al., entitled "CSI-RS Design With Dynamic Subframe Structure," filed May 18, 2016, each of which is incorporated by reference herein and assigned to the assignee hereof.

BACKGROUND

The following relates generally to wireless communication, and more specifically to CSI-RS design with dynamic subframe structure.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

A base station may transmit reference signals to a UE during a subframe to aid in channel estimation and channel quality feedback. In some cases, similar transmissions by nearby wireless devices or neighboring base stations may overlap with the signals received by the UE. This may reduce the effectiveness of channel estimation and additional scheduling by a base station, which may result in signal degradation and reduced throughput.

SUMMARY

A base station and user equipment (UE) may use subframe configurations that include dynamically scheduled channel state information reference signal (CSI-RS) symbols. For example, a base station may identify a subframe configuration that includes one or more sets of CSI-RS symbols of a subframe. The base station may indicate to a UE whether sets of CSI-RS symbols may be enabled or disabled during the subframe. The UE may receive multiple CSI-RSs at different locations within the subframe as indicated by the base station, and transmit CSI feedback to the base station based on at least one of the received CSI-RSs. In some examples, multiple base stations may coordinate the use of subframe configurations that include CSI-RS symbols that may be enabled or disabled.

A method of wireless communication is described. The method may include receiving an indication that one or more sets of a plurality of sets of channel state information reference signal (CSI-RS) symbols are to be enabled or disabled and receiving one or more CSI-RSs at corresponding locations in a subframe in accordance with the indication.

An apparatus for wireless communication is described. The apparatus may include means for receiving an indication that one or more sets of a plurality of sets of channel state information reference signal (CSI-RS) symbols are to be enabled or disabled and means for receiving one or more CSI-RSs at corresponding locations in a subframe in accordance with the indication.

Another apparatus for wireless communication is described. The apparatus may include a processor, memory in electronic communication with the processor, and instructions stored in the memory. The instructions may be operable to cause the processor to receive an indication that one or more sets of a plurality of sets of channel state information reference signal (CSI-RS) symbols are to be enabled or disabled and receive one or more CSI-RSs at corresponding locations in a subframe in accordance with the indication.

A non-transitory computer readable medium for wireless communication is described. The non-transitory computer-readable medium may include instructions operable to cause a processor to receive an indication that one or more sets of a plurality of sets of channel state information reference signal (CSI-RS) symbols are to be enabled or disabled and receive one or more CSI-RSs at corresponding locations in a subframe in accordance with the indication.

Some examples of the method, apparatus, or non-transitory computer-readable medium described above may further include processes, features, means, or instructions for transmitting one or more instances of CSI feedback based at least in part on at least one of the CSI-RSs.

In some examples of the method, apparatus, or non-transitory computer-readable medium described above, the CSI feedback includes feedback based on each of the one or more sets.

In some examples of the method, apparatus, or non-transitory computer-readable medium described above, the CSI feedback is generated based on each of the plurality of sets of CSI-RS symbols that has been enabled.

In some examples of the method, apparatus, or non-transitory computer-readable medium described above, the plurality of sets of CSI-RS symbols includes two non-overlapping sets of CSI-RS symbols.

In some examples of the method, apparatus, or non-transitory computer-readable medium described above, a set of the plurality of sets of CSI-RS symbols includes symbols located as the last two symbols of the subframe.

In some examples of the method, apparatus, or non-transitory computer-readable medium described above, the indication indicates that the set of CSI-RS symbols located as the last two symbols of the subframe is to be disabled and a different set of CSI-RS symbols located in a data portion of the subframe is to be enabled.

In some examples of the method, apparatus, or non-transitory computer-readable medium described above, the plurality of sets of CSI-RS symbols includes a set of CSI-RS symbols comprising two symbols located before the last two symbols of the subframe.

In some examples of the method, apparatus, or non-transitory computer-readable medium described above, the indication is signaled dynamically via a control channel.

In some examples of the method, apparatus, or non-transitory computer-readable medium described above, the CSI-RS is received over millimeter wave (mmW) frequency resources.

A method of wireless communication is described. The method may include transmitting an indication that one or more sets of a plurality of sets of channel state information reference signal (CSI-RS) symbols are to be enabled or disabled and transmitting one or more CSI-RSs at corresponding locations in a subframe in accordance with the indication.

An apparatus for wireless communication is described. The apparatus may include means for transmitting an indication that one or more sets of a plurality of sets of channel state information reference signal (CSI-RS) symbols are to be enabled or disabled and means for transmitting one or more CSI-RSs at corresponding locations in a subframe in accordance with the indication.

Another apparatus for wireless communication is described. The apparatus may include a processor, memory in electronic communication with the processor, and instructions stored in the memory. The instructions may be operable to cause the processor to transmit an indication that one or more sets of a plurality of sets of CSI-RS symbols are to be enabled or disabled and transmit one or more CSI-RSs at corresponding locations in a subframe in accordance with the indication.

A non-transitory computer readable medium for wireless communication is described. The non-transitory computer-readable medium may include instructions operable to cause a processor to transmit an indication that one or more sets of a plurality of sets of CSI-RS symbols are to be enabled or disabled and transmit one or more CSI-RSs at corresponding locations in a subframe in accordance with the indication.

Some examples of the method, apparatus, or non-transitory computer-readable medium described above may further include processes, features, means, or instructions for receiving one or more instances of CSI feedback based at least in part on the indication. In some examples of the method, apparatus, or non-transitory computer-readable medium described above, the CSI feedback includes feedback based on each of the one or more sets. In some examples of the method, apparatus, or non-transitory computer-readable medium described above, the CSI feedback is generated based on all of the sets of CSI-RS symbols that have been enabled.

In some examples of the method, apparatus, or non-transitory computer-readable medium described above, the plurality of sets of CSI-RS symbols includes two sets of CSI-RS symbols. In some examples of the method, apparatus, or non-transitory computer-readable medium described above, the plurality of sets of CSI-RS symbols includes a set of CSI-RS symbols located as the last two symbols of the subframe.

In some examples of the method, apparatus, or non-transitory computer-readable medium described above, the indication indicates that the set of CSI-RS symbols located as the last two symbols of the subframe is to be disabled and a different set of CSI-RS symbols located in a data portion of the subframe is to be enabled.

In some examples of the method, apparatus, or non-transitory computer-readable medium described above, the plurality of sets of CSI-RS symbols includes a set of CSI-RS symbols comprises two symbols located before the last two symbols of the subframe. In some examples of the method, apparatus, or non-transitory computer-readable medium described above, the indication is signaled dynamically via a control channel. In some examples of the method, apparatus, or non-transitory computer-readable medium described above, the CSI-RS is received over millimeter wave (mmW) frequency resources.

A method of wireless communication is described. The method may include receiving a subframe configuration coordination message from a neighbor base station, wherein the subframe configuration coordination message comprises an indication of a subframe configuration that includes a set of CSI-RS symbols, transmitting an indication of the subframe configuration to a UE, and receiving a CSI feedback message from the UE using at least one of the set of CSI-RS symbols based at least in part on the indication of the subframe configuration.

An apparatus for wireless communication is described. The apparatus may include means for receiving a subframe configuration coordination message from a neighbor base station, wherein the subframe configuration coordination message comprises an indication of a subframe configuration that includes a set of CSI-RS symbols, means for transmitting an indication of the subframe configuration to a UE, and means for receiving a CSI feedback message from the UE using at least one of the set of CSI-RS symbols based at least in part on the indication of the subframe configuration.

Another apparatus for wireless communication is described. The apparatus may include a processor, memory in electronic communication with the processor, and instructions stored in the memory. The instructions may be operable to cause the processor to receive a subframe configuration coordination message from a neighbor base station, wherein the subframe configuration coordination message comprises an indication of a subframe configuration that includes a set of CSI-RS symbols, transmit an indication of the subframe configuration to a UE, and receive a CSI feedback message from the UE using at least one of the set of CSI-RS symbols based at least in part on the indication of the subframe configuration.

A non-transitory computer readable medium for wireless communication is described. The non-transitory computer-readable medium may include instructions operable to cause a processor to receive a subframe configuration coordination message from a neighbor base station, wherein the subframe configuration coordination message comprises an indication of a subframe configuration that includes a set of CSI-RS symbols, transmit an indication of the subframe configuration to a UE, and receive a CSI feedback message from the UE using at least one of the set of CSI-RS symbols based at least in part on the indication of the subframe configuration.

In some examples of the method, apparatus, or non-transitory computer-readable medium described above, the subframe configuration enables or disables one or more sets of CSI-RS symbols from a plurality of sets of CSI-RS symbols. In some examples of the method, apparatus, or non-transitory computer-readable medium described above, the subframe configuration coordination message is received dynamically or semi-statically via a backhaul link. Some examples of the method, apparatus, or non-transitory computer-readable medium described above may further include processes, features, means, or instructions for transmitting a subframe configuration coordination message.

DETAILED DESCRIPTION

Figure 1:
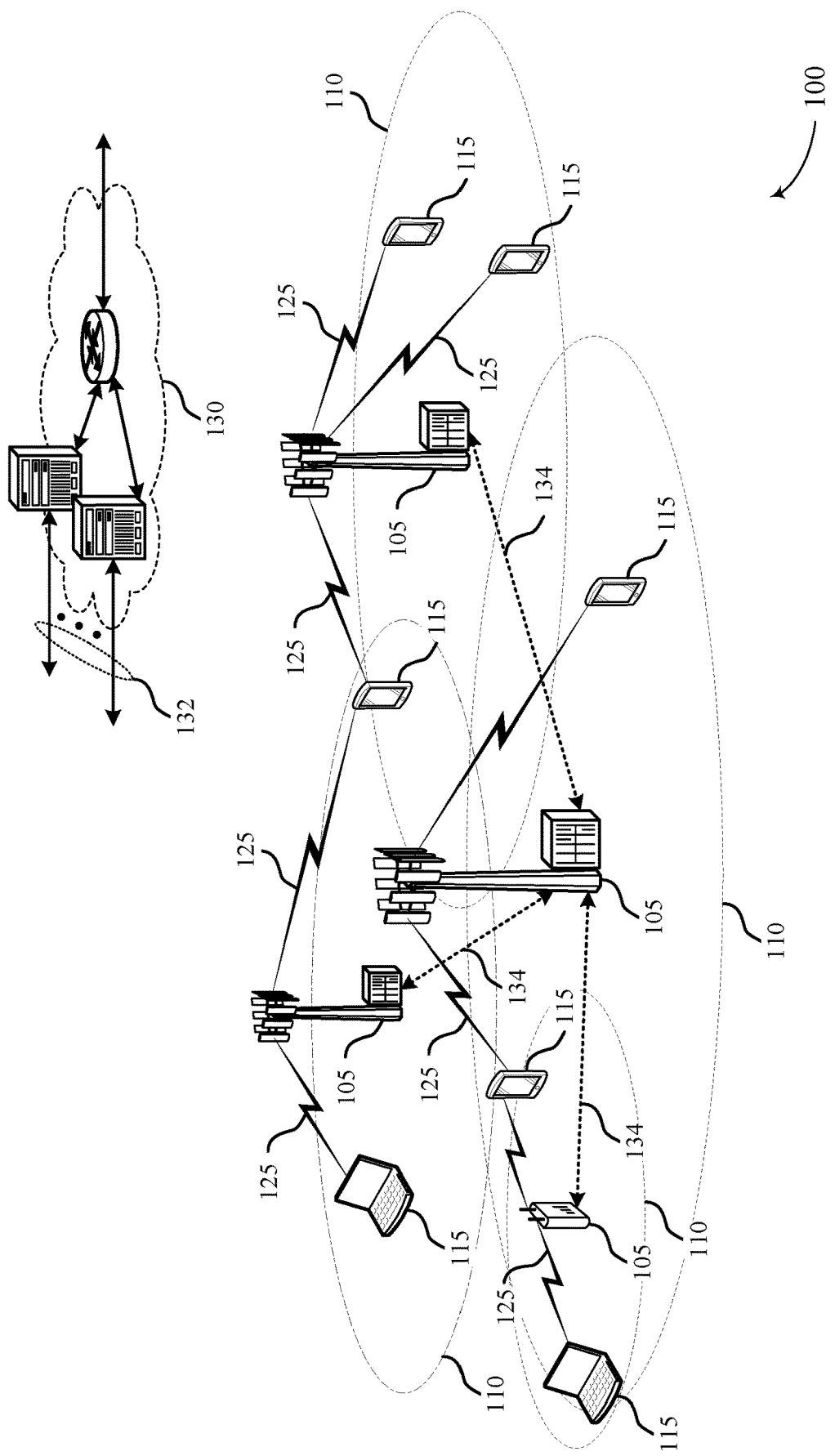
FIG. 1 illustrates an example of a system for wireless communication that supports channel state information reference signal (CSI-RS) design with dynamic subframe structure in accordance with aspects of the present disclosure.

Some wireless communication systems may operate in millimeter wave (mmW) frequency ranges, e.g., 28 GHz, 40 GHz, 60 GHz, etc. Wireless communication at these frequencies may be associated with increased signal attenuation (e.g., path loss), which may be influenced by various factors such as temperature, barometric pressure, diffraction, etc. As a result, signal processing techniques, such as beamforming, may be used to coherently combine energy and overcome path loss at these frequencies. Additionally, communication in such mmW systems may be time division multiplexed, where a transmission may only be directed to one wireless device at a time due to the directionality of the transmitted signal.

Reference signals transmitted by a base station (e.g., a channel state information reference signal (CSI-RS)) may be used to estimate the quality of a received signal at a user equipment (UE), which may be affected by interference from nearby wireless devices or neighboring base stations. The UE may report channel quality (e.g., channel state information (CSI)) to a base station regarding the channel conditions based on the received reference signal.

Various subframe configurations may be used for communicating data and control information. Subframe configurations may include a range of components, such as downlink (DL) data and control, uplink (UL) data and control, and CSI-RS transmissions, which may be scheduled at different durations (e.g., symbol periods) over the interval of a subframe. In some cases, the accuracy of a channel estimate by a UE may depend on the temporal location of a received CSI-RS in a subframe. That is, when a CSI-RS in a subframe configuration coincides with interference from DL or UL data transmissions, a UE may be able to provide a more robust channel estimation.

Wireless communications systems may use dynamic subframe structures to improve channel estimation and channel quality reporting. That is, a reference signal may be located during different symbol periods of a subframe, where additional symbol periods may be used for CSI-RS to capture interference from other cells or wireless devices. The subframe may include two sets of CSI-RS located in different symbol periods. Additionally or alternatively, a CSI-RS may be moved to a symbol period corresponding to a data portion of the subframe.

To further enhance the communication of a CSI report, base stations may coordinate the scheduling of various subframe configurations in use. For example, a first base station may coordinate with a second base station the subframe configurations to be used when each base station communicates. The coordination between the base stations may be done via a backhaul link and may be coordinated statically or semi-statically.

Aspects of the disclosure are initially described in the context of a wireless communication system. Aspects of the disclosure are further illustrated by and described with reference to apparatus diagrams, system diagrams, and flowcharts that relate to CSI-RS design with dynamic subframe structure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network. Wireless communications system 100 may represent a system that uses dynamically scheduled subframe configurations that enable enhanced channel estimation and feedback.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an MTC device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include CDMA systems, TDMA systems, FDMA systems, and OFDMA systems. A wireless multiple-access communications system may include a number of base stations, each simultaneously supporting communication for one or more multiple communication devices, which may be otherwise known as a UE.

In some cases, a wireless communications system may utilize one or more ECCs. An ECC may be characterized by one or more features including: flexible bandwidth, variable length TTIs, and modified control channel configuration. In some cases, an ECC may be associated with a carrier aggregation configuration or a dual connectivity configuration (i.e., when multiple serving cells have a suboptimal backhaul link). An ECC may also be configured for use in unlicensed spectrum or shared spectrum (where more than one operator is licensed to use the spectrum). An ECC characterized by flexible bandwidth may include one or more segments that may be utilized by UEs 115 that do are not capable of monitoring the whole bandwidth or prefer to use a limited bandwidth (e.g., to conserve power).

In some cases, an ECC may utilize a variable TTI length, which may include use of a reduced or variable symbol duration. In some cases the symbol duration may remain the same, but each symbol may represent a distinct TTI. In some cases an ECC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing.

Flexible bandwidth and variable TTIs may be associated with a modified control channel configuration (e.g., an ECC may utilize an ePDCCH for DL control information). For example, one or more control channels of an ECC may utilize FDM scheduling to accommodate flexible bandwidth use. Other control channel modifications include the use of additional control channels (e.g., for eMBMS scheduling, or to indicate the length of variable length UL and DL bursts), or control channels transmitted at different intervals. An ECC may also include modified or additional HARQ related control information.

A base station 105 may insert periodic pilot symbols such as CRS to aid UEs 115 in channel estimation and coherent demodulation. CRS may include one of 504 different cell identities. They may be modulated using QPSK and power boosted (e.g., transmitted at 6 dB higher than the surrounding data elements) to make them resilient to noise and interference. CRS may be embedded in 4 to 16 resource elements in each resource block based on the number of antenna ports or layers (up to 4) of the receiving UEs 115. In addition to CRS, which may be utilized by all UEs 115 in the coverage area 110 of the base station 105, DMRS may be directed toward specific UEs 115 and may be transmitted only on resource blocks assigned to those UEs 115. DMRS may include signals on 6 resource elements in each resource block in which they are transmitted. The DMRS for different antenna ports may each utilize the same 6 resource elements, and may be distinguished using different orthogonal cover codes (e.g., masking each signal with a different combination of 1 or −1 in different resource elements). In some cases, two sets of DMRS may be transmitted in adjoining resource elements. In some cases, additional reference signals known as channel state information reference signals (CSI-RS) may be included to aid in generating CSI. On the UL, a UE 115 may transmit a combination of periodic SRS and UL DMRS for link adaptation and demodulation, respectively.

A base station 105 may gather channel condition information from a UE 115 in order to efficiently configure the channel. This information may be sent from the UE 115 in the form of a channel state report. A channel state report may contain an RI requesting a number of layers to be used for DL transmissions (e.g., based on the antenna ports of the UE 115), a PMI indicating a preference for which precoder matrix should be used (based on the number of layers), and a CQI representing the highest MCS that may be used. CQI may be calculated by a UE 115 after receiving predetermined pilot symbols such as CRS or CSI-RS. RI and PMI may be excluded if the UE 115 does not support spatial multiplexing (or is not in support spatial mode). The types of information included in the report determines a reporting type. Channel state reports may be periodic or aperiodic. That is, a base station 105 may configure a UE 115 to send periodic reports at regular intervals, and may also request additional reports as needed. Aperiodic reports may include wideband reports indicating the channel quality across an entire cell bandwidth, UE selected reports indicating a subset of the best subbands, or configured reports in which the subbands reported are selected by the base station 105.

Wireless communications system 100 may operate in millimeter wave (mmW) frequency ranges, e.g., 28 GHz, 40 GHz, 60 GHz, etc. Wireless communication at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Additionally, communication in such mmW systems may be time division multiplexed, where a transmission may only be directed to one wireless device at a time due to the directionality of the transmitted signal.

Reference signals transmitted by a base station 105 (e.g., channel state information reference signals (CSI-RSs)) may be used to estimate the quality of a received signal by UE 115, which may be affected by interference from nearby wireless devices or neighboring base stations. The UE 115 may provide a report (e.g., channel state information (CSI)) to a base station 105 regarding the channel quality based on the received reference signal. The base station 105 may use the estimated channel information for scheduling additional communications.

In some cases, various subframe configurations may be used for communicating data and control information. Subframe configurations may include a range of components, such as DL control signals, a physical downlink shared channel (PDSCH), a physical uplink shared channel (PUSCH), a physical uplink control channel (PUCCH), CSI-RS, a sounding reference signal (SRS), a beam refinement reference signal (BRRS), and the like. Further signals may be included in a subframe, such as a reference signal for time and/or frequency tracking purposes. These subframe components and signals may be scheduled at different times (e.g., symbol periods) over the duration of a subframe. In some cases, certain types of subframe components, such as PUCCH, SRS, or CSI-RS, may be scheduled in the symbol periods at the end of a subframe.

As an example, Table 1 illustrates a number of different subframe configurations that may be used by a base station 105 and a UE 115 to communicate. For instance, subframe configuration 0 may include an initial symbol period with DL control information (Dc), followed by 11 symbol periods of DL data (Dd). The remaining symbol periods of subframe configuration 0 may further include either DL data or a transmission of CSI-RS (C-RS). As illustrated by the table, multiple subframe configurations may be possible, where different signals can be included in different symbol periods of a subframe, such as a guard period (GP), an SRS, UL control information (Uc), UL data (Ud), or a BRRS (B-RS). As discussed above, these subframe configurations may include certain signals, such as CSI-RS, during the last symbol periods of the subframe.

TABLE 1

| # | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | Dc | Dd | Dd | Dd | Dd | Dd | Dd | Dd | Dd | Dd | Dd | Dd | Dd C-RS | Dd C-RS |
| 1 | Dc | Dd | Dd | Dd | Dd | Dd | Dd | Dd | Dd | Dd | Dd | Dd | GP | Uc SRS |
| 2 | Dc | Dc | Dd | Dd | Dd | Dd | Dd | Dd | Dd | Dd | Dd | Dd | Dd C-RS | Dd C-RS |
| 3 | Dc | Dc | Dd | Dd | Dd | Dd | Dd | Dd | Dd | Dd | Dd | Dd | GP | Uc SRS |
| 4 | Dc | GP | Ud | Ud | Ud | Ud | Ud | Ud | Ud | Ud | Ud | Ud | Ud | Ud |
| 5 | Dc | GP | Ud | Ud | Ud | Ud | Ud | Ud | Ud | Ud | Ud | Ud | Ud | Uc SRS |
| 6 | Dc | GP | Ud | Ud | Ud | Ud | Ud | Ud | Ud | Ud | Ud | Ud | Ud | C-RS |
| 7 | Dc | GP | Ud | Ud | Ud | Ud | Ud | Ud | Ud | Ud | Ud | Ud | SRS | C-RS |
| 8 | Dc | GP | Ud | Ud | Ud | Ud | Ud | Ud | Ud | Ud | Ud | Ud | SRS | Uc |
| 9 | Dc | —/Dc | B-RS | B-RS | B-RS | B-RS | B-RS | B-RS | B-RS | B-RS | B-RS | B-RS | GP | Uc SRS |
| 10 | Dc | —/Dc | B-RS | B-RS | B-RS | B-RS | B-RS | B-RS | B-RS | B-RS | B-RS | B-RS | C-RS | C-RS |

Because various subframe configurations may be used by neighboring base stations 105, the accuracy of a channel estimate by a UE 115 may depend on the temporal location of a received CSI-RS during a subframe. For example, a CSI-RS transmitted by a first base station 105 may experience interference from a PUCCH, SRS, or a guard period transmitted by a second base station 105. However, this interference may not be representative of the interference experienced at the UE 115 when the second base station 105 is transmitting DL data. Thus, when a CSI-RS in a subframe configuration coincides with interference from DL or UL data transmissions, such as a PDSCH or PUSCH transmission from another base station 105, a UE 115 may be able to provide a more robust channel estimation.

Thus, a base station 105 and UE 115 may use subframe configurations that include dynamically scheduled CSI-RS symbols. For example, a base station 105 may identify a subframe configuration that includes one or more sets of CSI-RS symbols of a subframe. The base station may indicate to a UE 115 whether sets of CSI-RS symbols may be enabled or disabled during the subframe. The UE 115 may receive multiple CSI-RSs at different locations within the subframe as indicated by the base station, and the UE 115 may transmit CSI feedback to the base station 105 based on at least one of the received CSI-RSs. In some examples, multiple base stations 105 may coordinate the use of subframe configurations that include CSI-RS symbols that may be enabled or disabled.

Figure 2:
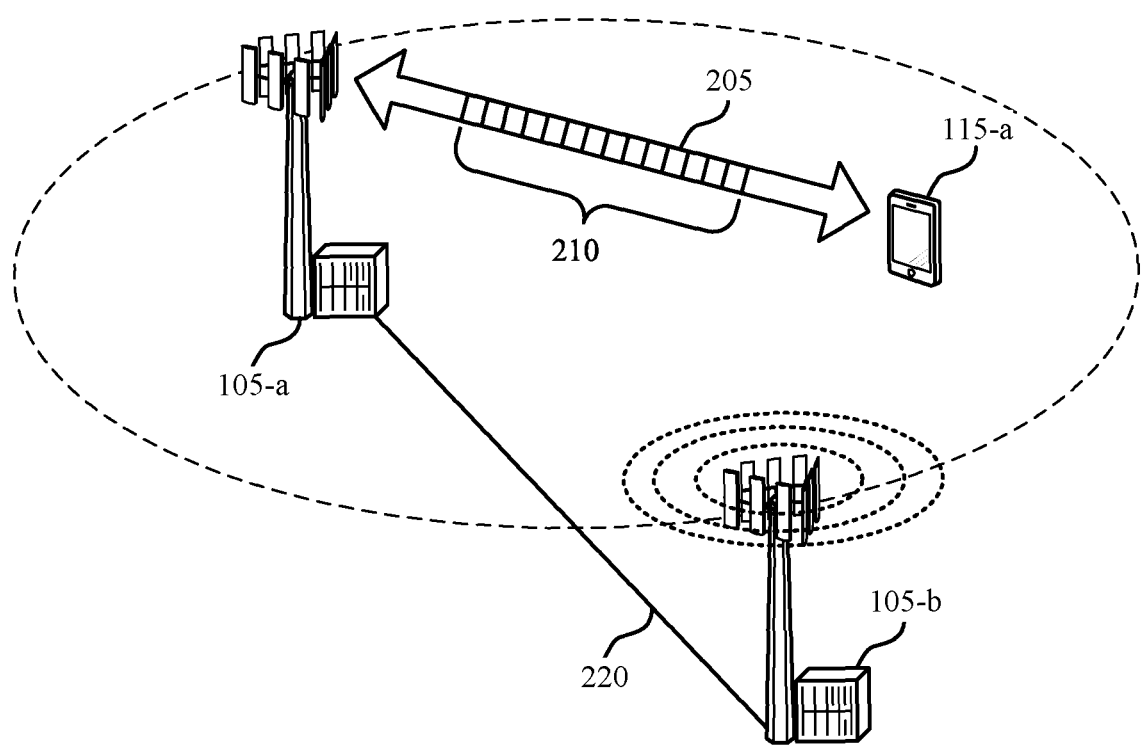
FIG. 2 illustrates an example of a wireless communications system that supports CSI-RS design with dynamic subframe structure in accordance with aspects of the present disclosure.

FIG. 2 illustrates an example of a wireless communications system 200 for CSI-RS design with dynamic subframe structure. In some cases, wireless communications system 200 may represent aspects of techniques performed by a UE 115 or base station 105 as described with reference to FIG. 1. Wireless communications system may support the use of subframe configurations that enable enhanced channel quality feedback and scheduling.

CSI-RS may be transmitted in symbols of the subframe that are occupied by either PDSCH or PUSCH. The UE may receive dynamic (e.g., PDCCH or DCI) or radio resource control (RRC) signaling from the base station regarding whether or not it should transmit one or both sets of CSI-RS feedback to the base station. The base station may inform the UEs which sets of CSI-RS symbols are activated or enabled. If both or multiple sets are activated, the base station may inform UEs which sets of measurement may need to be included in the feedback sent to the base station. The indication of the sets of CSI-RS symbols may be signaled dynamically via a physical downlink control channel. Separate bits may be reversed in downlink control information to convey the indication. The indication may be signaled via RRC. Further, the subframe configuration message from neighboring base stations may be processed in such a way that neighboring base stations transmit CSI-RS in the same set of symbols of the subframe. CSI-RS may be transmitted in symbols of the subframe that are occupied by PDSCH in neighboring base stations.

Figure 3:
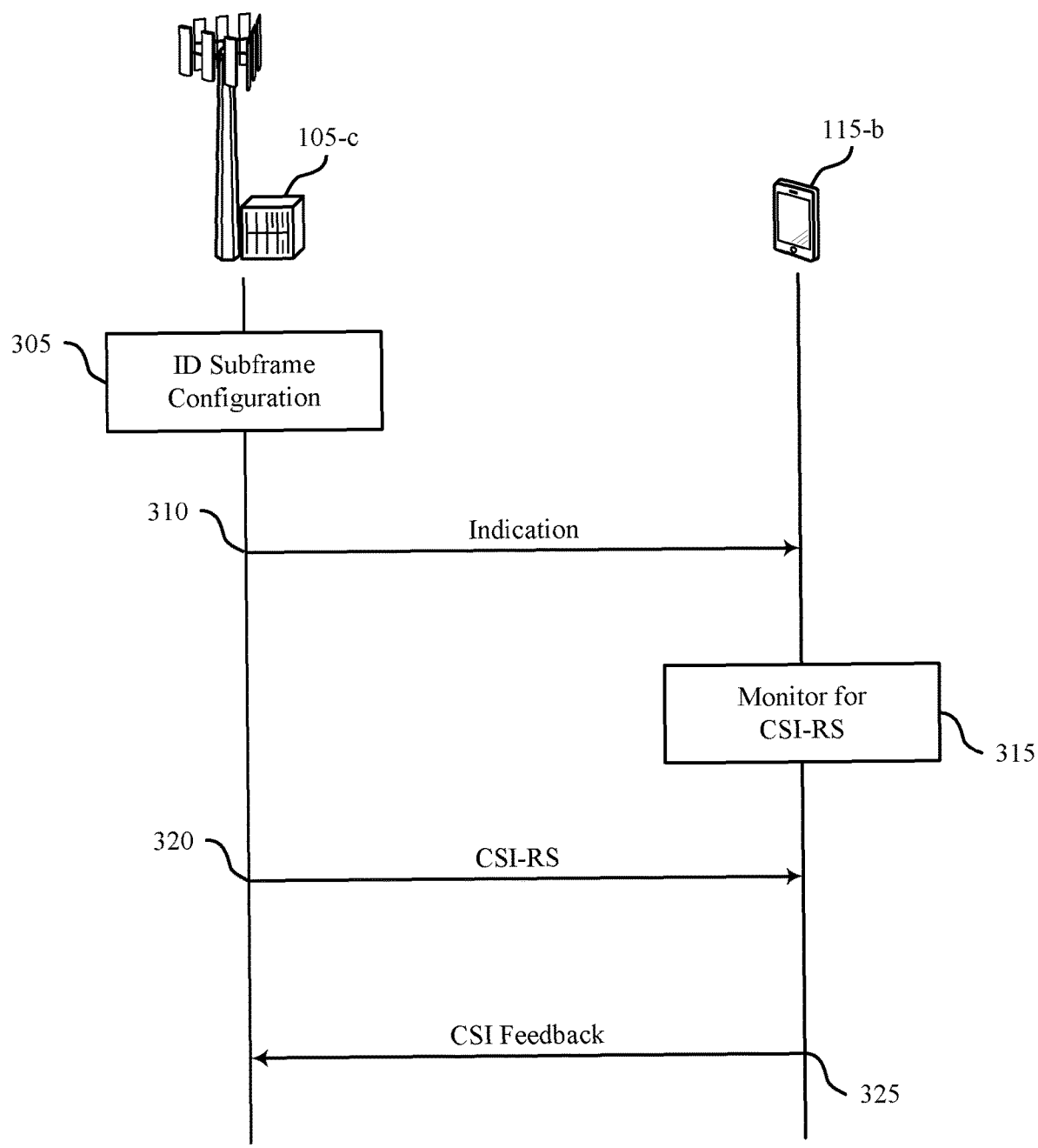
FIGS. 3 and 4 illustrate examples of process flows in a system that supports CSI-RS design with dynamic subframe structure in accordance with aspects of the present disclosure.

FIG. 3 illustrates an example of a process flow 300 in a system that supports a CSI-RS design with dynamic subframe structure. Process flow 300 may include base station 105-c and UE 115-b, which may be examples of the corresponding devices described with reference to FIGS. 1-2.

At step 305, base station 105-c may identify a subframe configuration for a subframe. Base station 105-c may also determine whether to enable or disable one or more sets of a plurality of sets of CSI-RS symbols based at least in part on the subframe configuration.

At step 310, base station 105-c may transmit, and UE 115-b may receive, an indication that one or more sets of a plurality of sets of channel state information reference signal (CSI-RS) symbols are to be enabled or disabled. In some cases, the plurality of sets of CSI-RS symbols includes two non-overlapping sets of CSI-RS symbols. In some examples, a set of the plurality of sets of CSI-RS symbols includes symbols located as the last two symbols of the subframe. The indication may indicate that the set of CSI-RS symbols located as the last two symbols of the subframe is to be disabled and a different set of CSI-RS symbols located in a data portion of the subframe is to be enabled. In some examples, the indication may be signaled dynamically via a control channel. The indication to enable or disable one or more sets of CSI-RS symbols may occur in combination with the indication of where CSI-RS symbols are located in the subframe.

At step 315, UE 115-*b* may monitor for the one or more sets of CSI-RS symbols. In some cases, the plurality of sets of CSI-RS symbols includes a set of CSI-RS symbols including two symbols located before the last two symbols of the subframe. At step 320, UE 115-*b* may receive from base station 105-*c* one or more CSI-RSs at corresponding locations in a subframe in accordance with the indication. In some cases, the CSI-RS may be received over millimeter wave (mmW) frequency resources.

At step 325, UE 115-*b* may transmit, and base station 105-*c* may receive, one or more instances of CSI feedback based at least in part on at least one of the CSI-RSs. In some cases, the CSI feedback may include feedback based on each of the one or more sets. Additionally or alternatively, the CSI feedback may be generated based on each of the plurality of sets of CSI-RS symbols that has been enabled.

Figure 4:
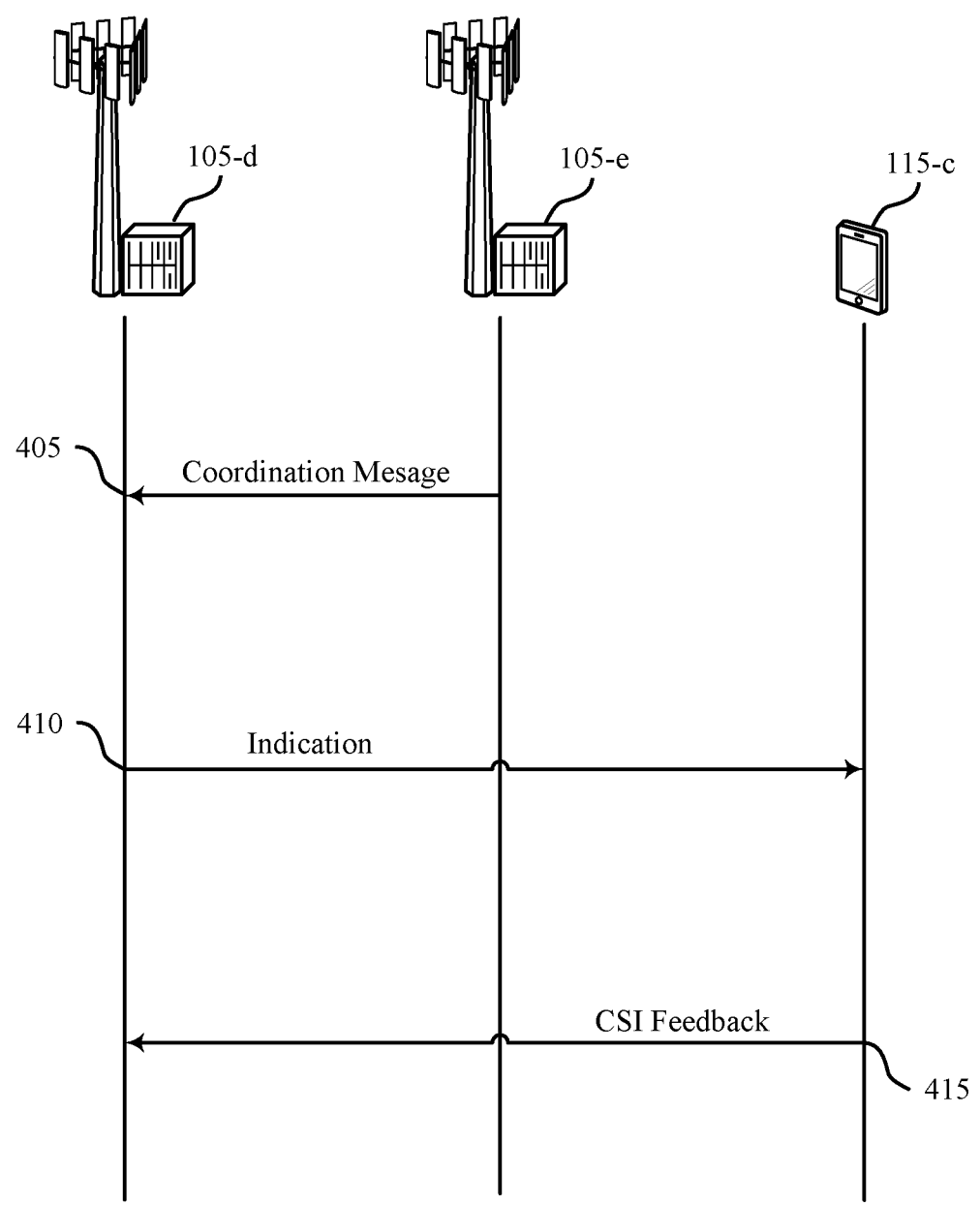

FIG. 4 illustrates an example of a process flow 400 for a system that supports a CSI-RS design with dynamic subframe structure. Process flow 400 may include base station 105-*d*, base station 105-*e*, and UE 115-*c*, which may be examples of the corresponding devices described with reference to FIGS. 1-2.

At step 405, base station 105-*d* may receive a subframe configuration coordination message from base station 105-*e*, which may be a neighboring base station. In some cases, the subframe configuration coordination message includes an indication of a subframe configuration that includes a set of CSI-RS symbols. The subframe configuration coordination message may be received dynamically or semi-statically via a backhaul link. In some cases, base station 105-*d* may transmit a subframe configuration coordination message.

At step 410, base station 105-*d* may transmit, and UE 115-*c* may receive, an indication of the subframe configuration. In some cases, the subframe configuration may enable or disable one or more sets of CSI-RS symbols from a plurality of sets of CSI-RS symbols. At step 415, base station 105-*d* may receive a CSI feedback message from UE 115-*c* using at least one of the set of CSI-RS symbols based at least in part on the indication of the subframe configuration.

Figure 5:
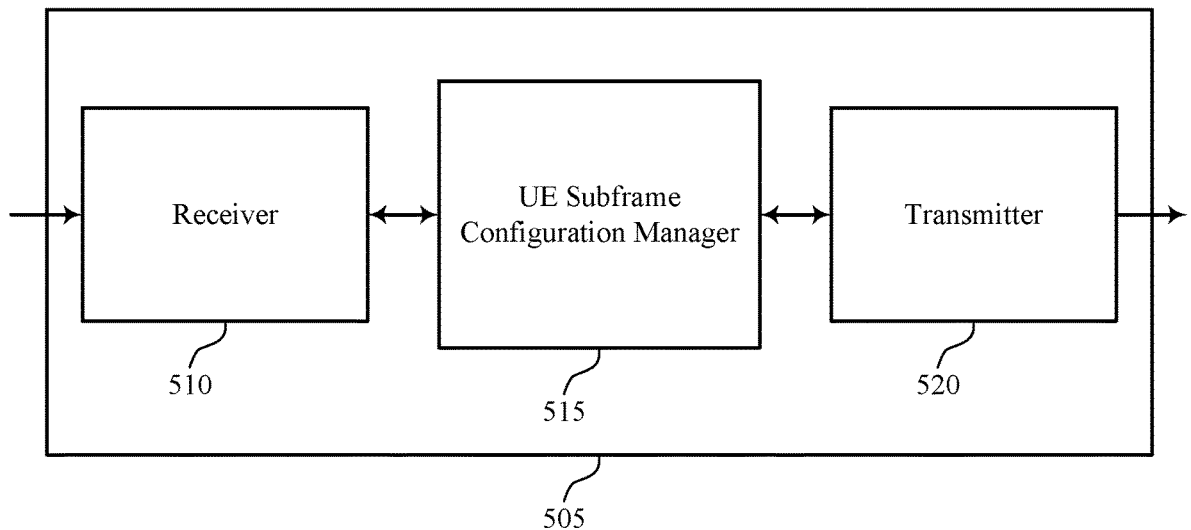
FIGS. 5 through 7 show block diagrams of a device that supports CSI-RS design with dynamic subframe structure in accordance with aspects of the present disclosure.

FIG. 5 shows a block diagram 500 of a device 505 that supports CSI-RS design with dynamic subframe structure in accordance with various aspects of the present disclosure. Device 505 may be an example of aspects of a UE 115 as described with reference to FIGS. 1 and 2. Device 505 may include receiver 510, UE subframe configuration manager 515, and transmitter 520. Device 505 may also include a processor. Each of these components may be in communication with one another (e.g., via one or more buses).

Receiver 510 may receive information such as packets, user data, or control information associated with various information channels (e.g., control channels, data channels, and information related to CSI-RS design with dynamic subframe structure, etc.). Information may be passed on to other components of the device. The receiver 510 may be an example of aspects of the transceiver 840 described with reference to FIG. 8.

UE subframe configuration manager 515 may be an example of aspects of the UE subframe configuration manager 815 described with reference to FIG. 8.

UE subframe configuration manager 515 may receive an indication that one or more sets of a set of sets of channel state information reference signal (CSI-RS) symbols are to be enabled or disabled and receive one or more CSI-RSs at corresponding locations in a subframe in accordance with the indication.

Transmitter 520 may transmit signals generated by other components of the device. In some examples, the transmitter 520 may be collocated with a receiver 510 in a transceiver module. For example, the transmitter 520 may be an example of aspects of the transceiver 840 described with reference to FIG. 8. The transmitter 520 may include a single antenna, or it may include a set of antennas.

Figure 6:
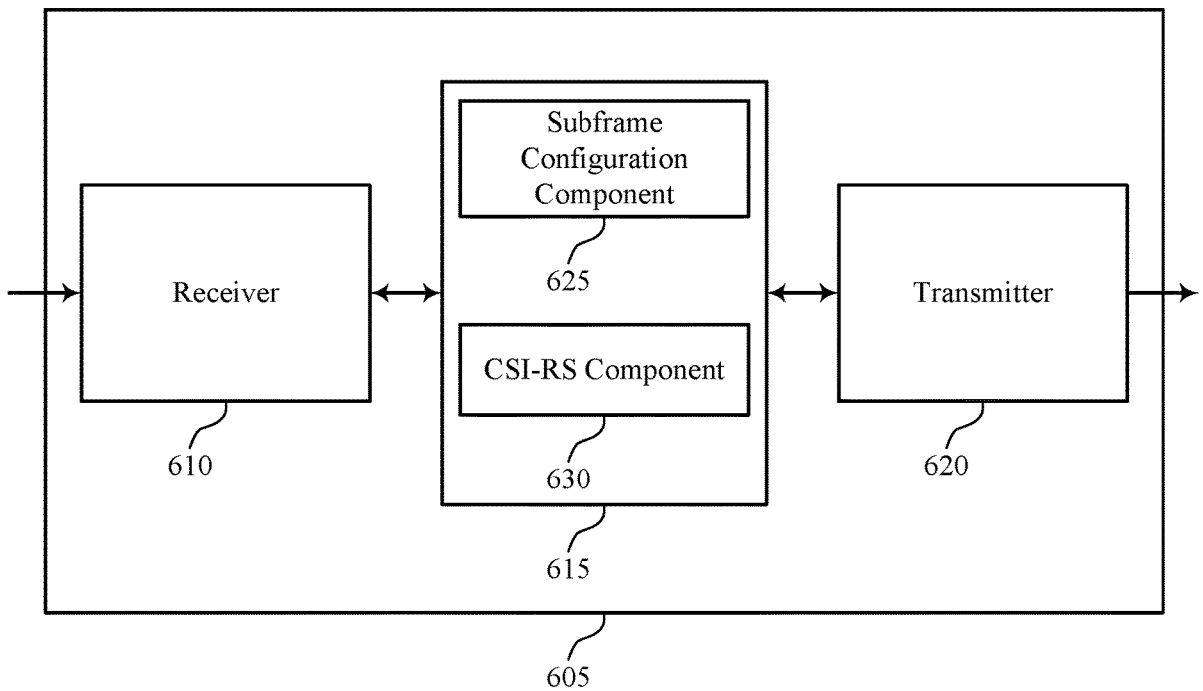

FIG. 6 shows a block diagram 600 of a device 605 that supports CSI-RS design with dynamic subframe structure in accordance with various aspects of the present disclosure. Device 605 may be an example of aspects of a device 505 or a UE 115 as described with reference to FIGS. 1, 2 and 5. Device 605 may include receiver 610, UE subframe configuration manager 615, and transmitter 620. Device 605 may also include a processor. Each of these components may be in communication with one another (e.g., via one or more buses).

Receiver 610 may receive information such as packets, user data, or control information associated with various information channels (e.g., control channels, data channels, and information related to CSI-RS design with dynamic subframe structure, etc.). Information may be passed on to other components of the device. The receiver 610 may be an example of aspects of the transceiver 840 described with reference to FIG. 8. UE subframe configuration manager 615 may be an example of aspects of the UE subframe configuration manager 815 described with reference to FIG. 8. UE subframe configuration manager 615 may also include subframe configuration component 625 and CSI-RS component 630.

Subframe configuration component 625 may receive an indication that one or more sets of a set of sets of channel state information reference signal (CSI-RS) symbols are to be enabled or disabled. In some cases, the indication indicates that the set of CSI-RS symbols located as the last two symbols of the subframe is to be disabled and a different set of CSI-RS symbols located in a data portion of the subframe is to be enabled. In some cases, the indication is signaled dynamically via a control channel. CSI-RS component 630 may receive one or more CSI-RSs at corresponding locations in a subframe in accordance with the indication. In some cases, the CSI-RS is received over millimeter wave (mmW) frequency resources.

Transmitter 620 may transmit signals generated by other components of the device. In some examples, the transmitter 620 may be collocated with a receiver 610 in a transceiver module. For example, the transmitter 620 may be an example of aspects of the transceiver 840 described with reference to FIG. 8. The transmitter 620 may include a single antenna, or it may include a set of antennas.

Figure 7:
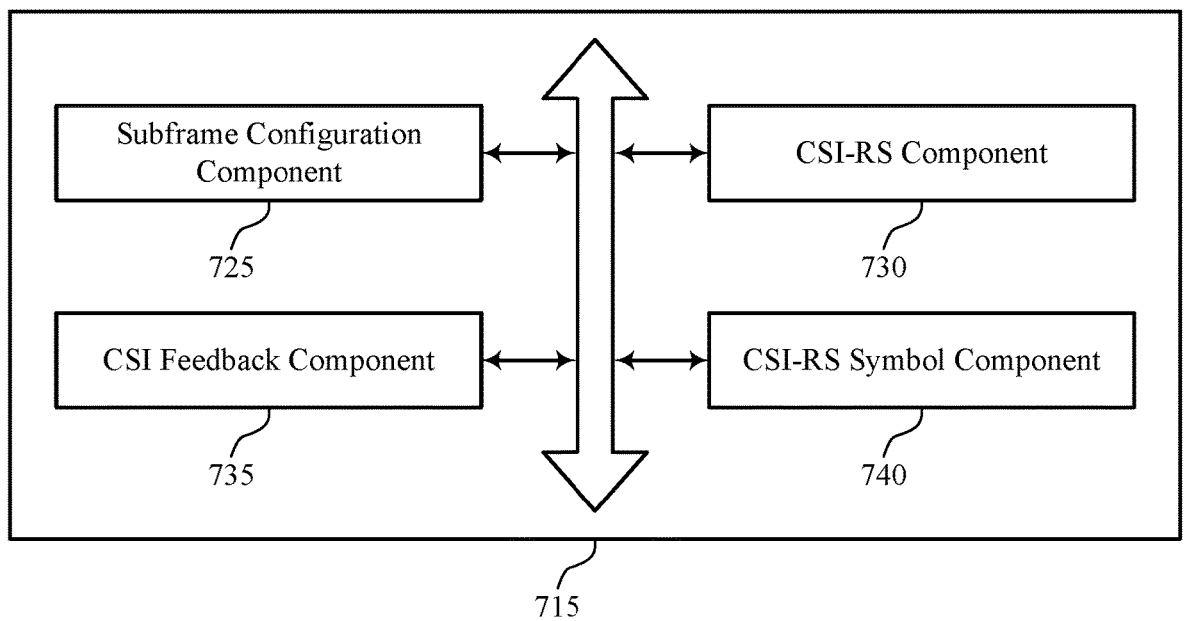

FIG. 7 shows a block diagram 700 of a UE subframe configuration manager 715 that supports CSI-RS design with dynamic subframe structure in accordance with various aspects of the present disclosure. The UE subframe configuration manager 715 may be an example of aspects of a UE subframe configuration manager 515, a UE subframe configuration manager 615, or a UE subframe configuration manager 815 described with reference to FIGS. 5, 6, and 8. The UE subframe configuration manager 715 may include subframe configuration component 725 and CSI-RS component 730. Each of these modules may communicate, directly or indirectly, with one another (e.g., via one or more buses).

Subframe configuration component 725 may receive an indication that one or more sets of a set of sets of channel state information reference signal (CSI-RS) symbols are to be enabled or disabled. In some cases, the indication indicates that the set of CSI-RS symbols located as the last two symbols of the subframe is to be disabled and a different set of CSI-RS symbols located in a data portion of the subframe is to be enabled. In some cases, the indication is signaled dynamically via a control channel.

CSI-RS component 730 may receive one or more CSI-RSs at corresponding locations in a subframe in accordance with the indication. In some cases, the CSI-RS is received over millimeter wave (mmW) frequency resources. CSI feedback component 735 may transmit one or more instances of CSI feedback based on at least one of the CSI-RSs. In some cases, the CSI feedback includes feedback based on each of the one or more sets. In some cases, the CSI feedback is generated based on each of the set of sets of CSI-RS symbols that has been enabled.

CSI-RS symbol component 740 may determine which symbols in a subframe configuration include CSI-RS. In some cases, the set of sets of CSI-RS symbols includes two non-overlapping sets of CSI-RS symbols. In some cases, a set of the set of sets of CSI-RS symbols includes symbols located as the last two symbols of the subframe. In some cases, the set of sets of CSI-RS symbols includes a set of CSI-RS symbols including two symbols located before the last two symbols of the subframe.

Figure 8:
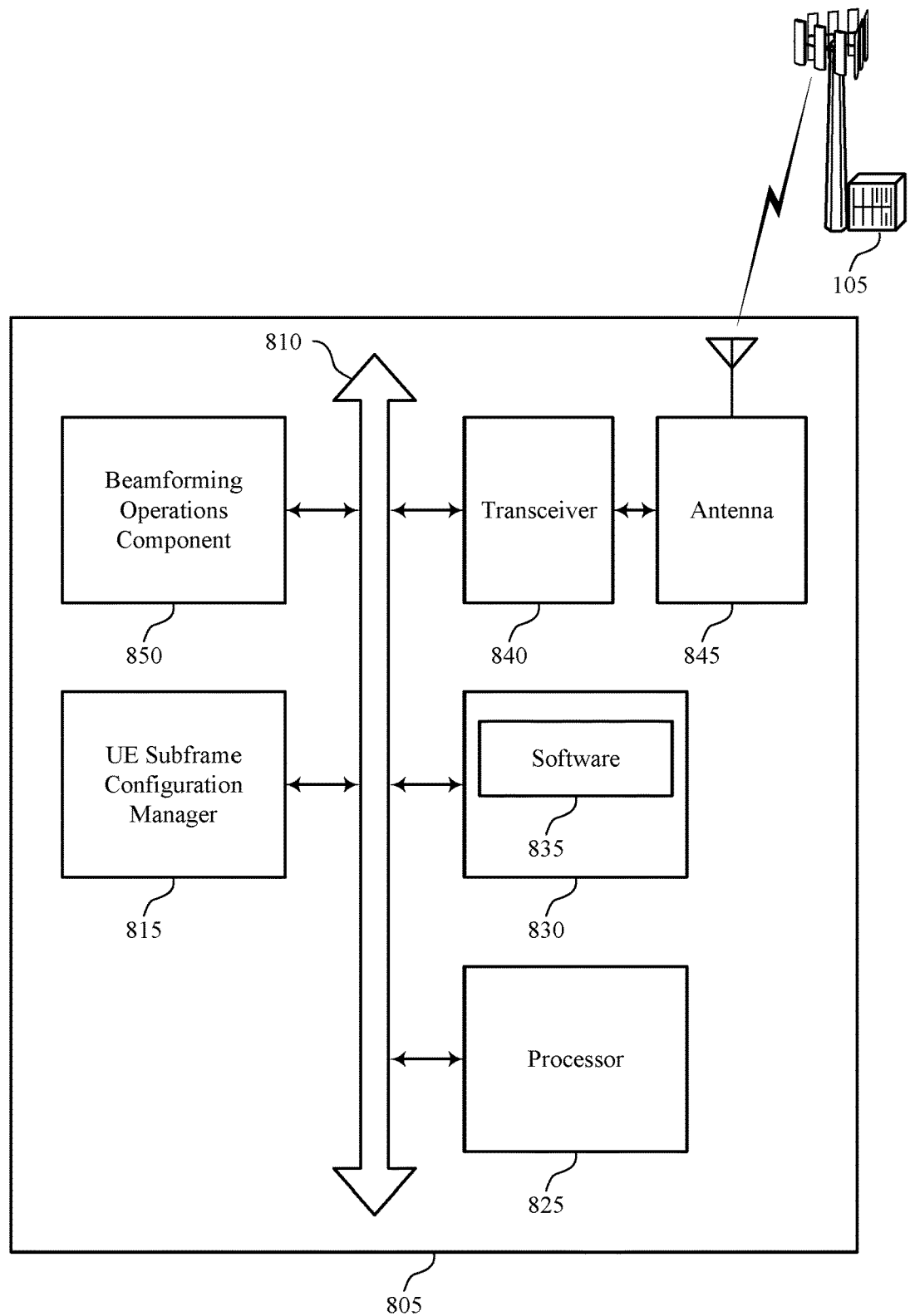
FIG. 8 illustrates a block diagram of a system including a UE that supports CSI-RS design with dynamic subframe structure in accordance with aspects of the present disclosure.

FIG. 8 shows a diagram of a system 800 including a device 805 that supports CSI-RS design with dynamic subframe structure in accordance with various aspects of the present disclosure. Device 805 may be an example of a device 505, device 605, or a UE 115 as described above, e.g., with reference to FIGS. 1, 2, 5 and 6.

Device 805 may include components for bi-directional voice and data communications including components for transmitting and receiving communications, including UE subframe configuration manager 815, processor 825, memory 830, software 835, transceiver 840, antenna 845, and beamforming operations component 850. Processor 825 may include an intelligent hardware device, (e.g., a central processing unit (CPU), a microcontroller, an application specific integrated circuit (ASIC), etc.)

Memory 830 may include random access memory (RAM) and read only memory (ROM). The memory 830 may store computer-readable, computer-executable software 835 including instructions that, when executed, cause the processor to perform various functions described herein. In some cases, the memory 830 can contain, among other things, a Basic Input-Output system (BIOS) which may control basic hardware and/or software operation such as the interaction with peripheral components or devices.

Software 835 may include code to implement aspects of the present disclosure, including code to support CSI-RS design with dynamic subframe structure. Software 835 can be stored in a non-transitory computer-readable medium such as system memory or other memory. In some cases, the software 835 may not be directly executable by the processor but may cause a computer (e.g., when compiled and executed) to perform functions described herein.

Transceiver 840 may communicate bi-directionally, via one or more antennas, wired, or wireless links as described above. For example, the transceiver 840 may represent a wireless transceiver and may communicate bi-directionally with another wireless transceiver. The transceiver 840 may also include a modem to modulate the packets and provide the modulated packets to the antennas for transmission, and to demodulate packets received from the antennas. In some cases, the wireless device may include a single antenna 845. However, in some cases the device may have more than one antenna 845, which may be capable of concurrently transmitting or receiving multiple wireless transmissions. Beamforming operations component 850 may enable beamforming operations described herein.

Figure 9:
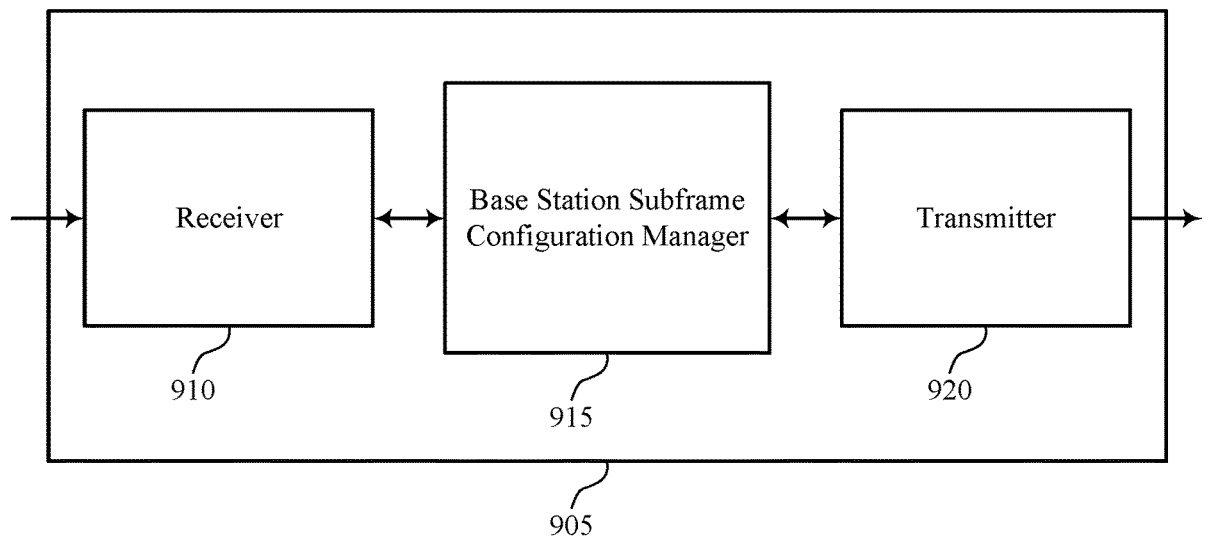
FIGS. 9 through 11 show block diagrams of a device that supports CSI-RS design with dynamic subframe structure in accordance with aspects of the present disclosure.

FIG. 9 shows a block diagram 900 of a device 905 that supports CSI-RS design with dynamic subframe structure in accordance with various aspects of the present disclosure. Device 905 may be an example of aspects of a base station 105 as described with reference to FIGS. 1 and 2. Device 905 may include receiver 910, base station subframe configuration manager 915, and transmitter 920. Device 905 may also include a processor. Each of these components may be in communication with one another (e.g., via one or more buses).

Receiver 910 may receive information such as packets, user data, or control information associated with various information channels (e.g., control channels, data channels, and information related to CSI-RS design with dynamic subframe structure, etc.). Information may be passed on to other components of the device. The receiver 910 may be an example of aspects of the transceiver 1240 described with reference to FIG. 12.

Base station subframe configuration manager 915 may be an example of aspects of the base station subframe configuration manager 1215 described with reference to FIG. 12.

Base station subframe configuration manager 915 may transmit an indication that one or more sets of a set of sets of channel state information reference signal (CSI-RS) symbols are to be enabled or disabled, transmit one or more CSI-RSs at corresponding locations in a subframe in accordance with the indication, receive a subframe configuration coordination message from a neighbor base station, where the subframe configuration coordination message includes an indication of a subframe configuration that includes a set of channel state information reference signals (CSI-RS) symbols, transmit an indication of the subframe configuration to a UE, and receive a CSI feedback message from the UE using at least one of the set of CSI-RS symbols based on the indication of the subframe configuration.

Transmitter 920 may transmit signals generated by other components of the device. In some examples, the transmitter 920 may be collocated with a receiver 910 in a transceiver module. For example, the transmitter 920 may be an example of aspects of the transceiver 1240 described with reference to FIG. 12. The transmitter 920 may include a single antenna, or it may include a set of antennas.

Figure 10:
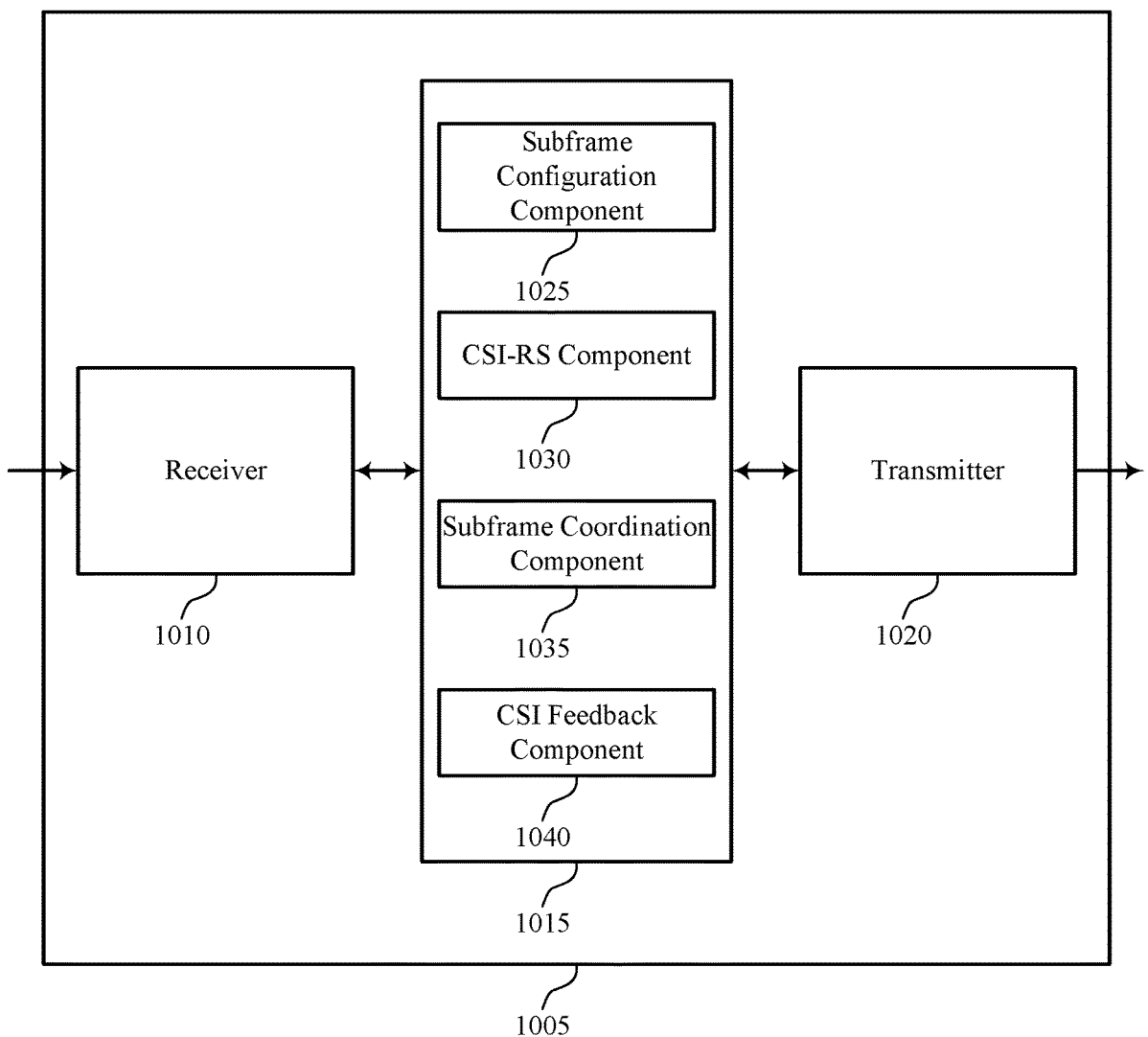

FIG. 10 shows a block diagram 1000 of a device 1005 that supports CSI-RS design with dynamic subframe structure in accordance with various aspects of the present disclosure. Device 1005 may be an example of aspects of a device 905 or a base station 105 as described with reference to FIGS. 1, 2 and 9. Device 1005 may include receiver 1010, base station subframe configuration manager 1015, and transmitter 1020. Device 1005 may also include a processor. Each of these components may be in communication with one another (e.g., via one or more buses).

Receiver 1010 may receive information such as packets, user data, or control information associated with various information channels (e.g., control channels, data channels, and information related to CSI-RS design with dynamic subframe structure, etc.). Information may be passed on to other components of the device. The receiver 1010 may be an example of aspects of the transceiver 1240 described with reference to FIG. 12.

Base station subframe configuration manager 1015 may be an example of aspects of the base station subframe configuration manager 1215 described with reference to FIG. 12. Base station subframe configuration manager 1015 may also include subframe configuration component 1025, CSI-RS component 1030, subframe coordination component 1035, and CSI feedback component 1040.

Subframe configuration component 1025 may transmit an indication that one or more sets of a set of sets of channel state information reference signal (CSI-RS) symbols are to be enabled or disabled and transmit an indication of the subframe configuration to a UE. In some cases, the indication indicates that the set of CSI-RS symbols located as the last two symbols of the subframe is to be disabled and a different set of CSI-RS symbols located in a data portion of the subframe is to be enabled. In some cases, the indication is signaled dynamically via a control channel. In some cases, the subframe configuration enables or disables one or more sets of CSI-RS symbols from a set of sets of CSI-RS symbols.

CSI-RS component 1030 may transmit one or more CSI-RSs at corresponding locations in a subframe in accordance with the indication. In some cases, the CSI-RS is received over millimeter wave (mmW) frequency resources.

Subframe coordination component 1035 may receive a subframe configuration coordination message from a neighbor base station, where the subframe configuration coordination message includes an indication of a subframe configuration that includes a set of channel state information reference signals (CSI-RS) symbols and transmit a subframe configuration coordination message. In some cases, the subframe configuration coordination message is received dynamically or semi-statically via a backhaul link.

CSI feedback component 1040 may receive one or more instances of CSI feedback based on the indication and receive a CSI feedback message from the UE using at least one of the set of CSI-RS symbols based on the indication of the subframe configuration. In some cases, the CSI feedback includes feedback based on each of the one or more sets. In some cases, the CSI feedback is generated based on all of the sets of CSI-RS symbols that have been enabled.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1240 described with reference to FIG. 12. The transmitter 1020 may include a single antenna, or it may include a set of antennas.

Figure 11:
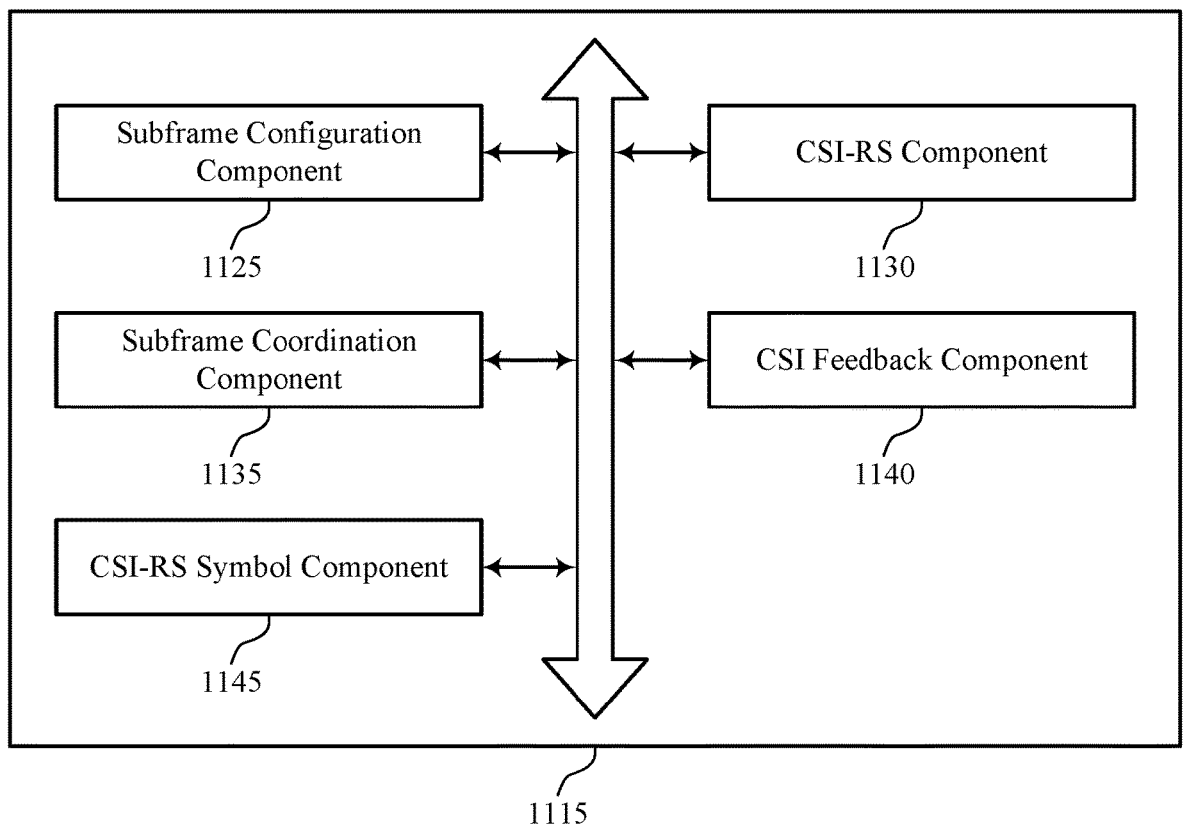

FIG. 11 shows a block diagram 1100 of a base station subframe configuration manager 1115 that supports CSI-RS design with dynamic subframe structure in accordance with various aspects of the present disclosure. The base station subframe configuration manager 1115 may be an example of aspects of a base station subframe configuration manager 915, a base station subframe configuration manager 1015, or a base station subframe configuration manager 1215 described with reference to FIGS. 9, 10, and 12. The base station subframe configuration manager 1115 may include subframe configuration component 1125, CSI-RS component 1130, subframe coordination component 1135, and CSI feedback component 1140. Each of these modules may communicate, directly or indirectly, with one another (e.g., via one or more buses).

Subframe configuration component 1125 may transmit an indication that one or more sets of a set of sets of channel state information reference signal (CSI-RS) symbols are to be enabled or disabled and transmit an indication of the subframe configuration to a UE. In some cases, the indication indicates that the set of CSI-RS symbols located as the last two symbols of the subframe is to be disabled and a different set of CSI-RS symbols located in a data portion of the subframe is to be enabled. In some cases, the indication is signaled dynamically via a control channel. In some cases, the subframe configuration enables or disables one or more sets of CSI-RS symbols from a set of sets of CSI-RS symbols.

CSI-RS component 1130 may transmit one or more CSI-RSs at corresponding locations in a subframe in accordance with the indication. In some cases, the CSI-RS is received over millimeter wave (mmW) frequency resources.

Subframe coordination component 1135 may receive a subframe configuration coordination message from a neighbor base station, where the subframe configuration coordination message includes an indication of a subframe configuration that includes a set of channel state information reference signals (CSI-RS) symbols and transmit a subframe configuration coordination message. In some cases, the subframe configuration coordination message is received dynamically or semi-statically via a backhaul link.

CSI feedback component 1140 may receive one or more instances of CSI feedback based on the indication and receive a CSI feedback message from the UE using at least one of the set of CSI-RS symbols based on the indication of the subframe configuration. In some cases, the CSI feedback includes feedback based on each of the one or more sets. In some cases, the CSI feedback is generated based on all of the sets of CSI-RS symbols that have been enabled.

CSI-RS symbol component 1145 may provide an indication of how many sets and at what location in a subframe CSI-RS symbols are to be transmitted. In some cases, the set of sets of CSI-RS symbols includes two sets of CSI-RS symbols. In some cases, the set of sets of CSI-RS symbols includes a set of CSI-RS symbols located as the last two symbols of the subframe. In some cases, the set of sets of CSI-RS symbols includes a set of CSI-RS symbols includes two symbols located before the last two symbols of the subframe. The indication to enable or disable one or more sets of CSI-RS symbols may occur in combination with the indication of where CSI-RS symbols are located in the subframe.

Figure 12:
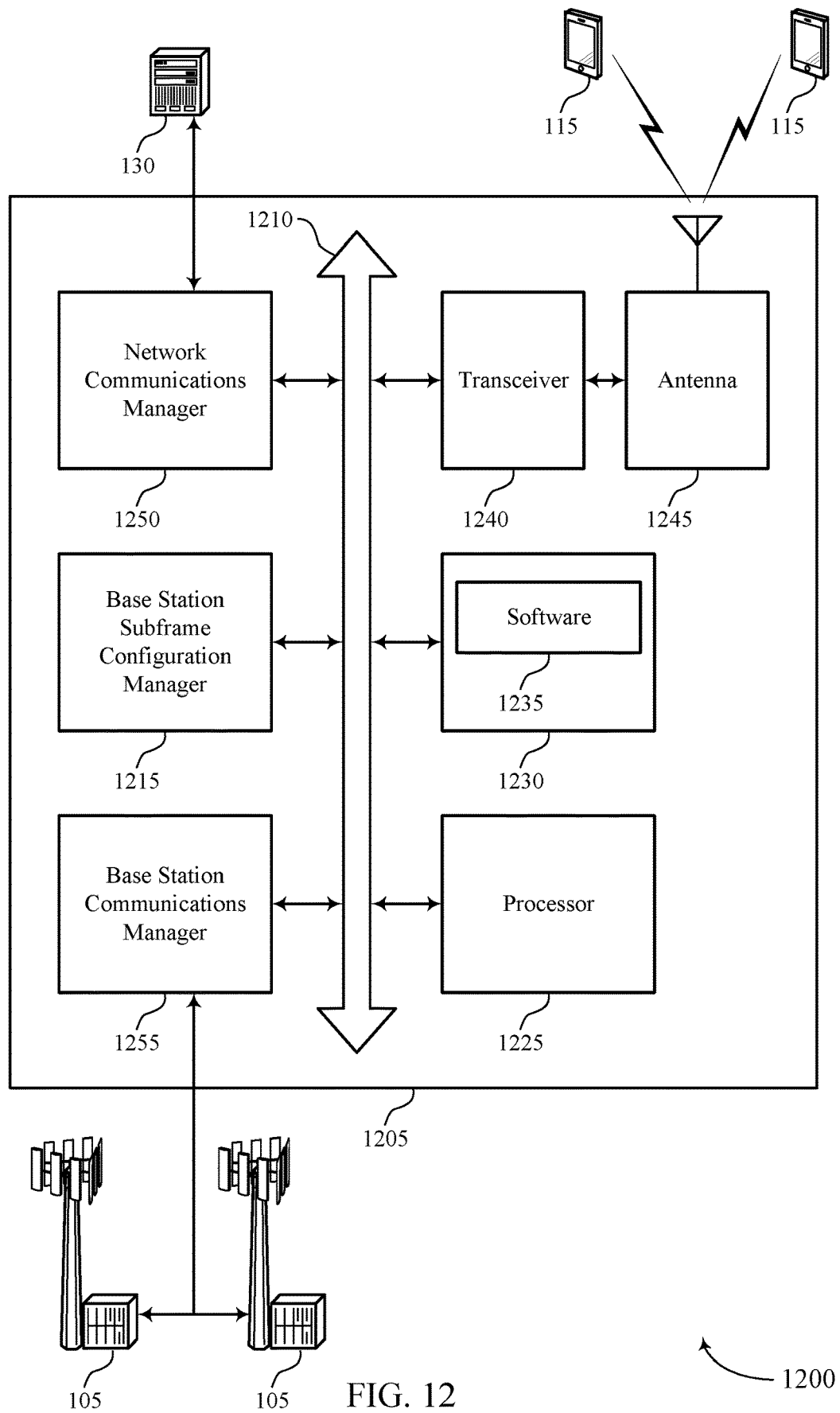
FIG. 12 illustrates a block diagram of a system including a base station that supports CSI-RS design with dynamic subframe structure in accordance with aspects of the present disclosure.

FIG. 12 shows a diagram of a system 1200 including a device 1205 that supports CSI-RS design with dynamic subframe structure in accordance with various aspects of the present disclosure. Device 1205 may be an example of a device 905, device 1005, or a base station 105 as described above, e.g., with reference to FIGS. 1, 2, 9 and 10.

Device 1205 may include components for bi-directional voice and data communications including components for transmitting and receiving communications, including base station subframe configuration manager 1215, processor 1225, memory 1230, software 1235, transceiver 1240, antenna 1245, network communications manager 1250, and base station communications manager 1255. Processor 1225 may include an intelligent hardware device, (e.g., a central processing unit (CPU), a microcontroller, an application specific integrated circuit (ASIC), etc.)

Memory 1230 may include random access memory (RAM) and read only memory (ROM). The memory 1230 may store computer-readable, computer-executable software 1235 including instructions that, when executed, cause the processor to perform various functions described herein. In some cases, the memory 1230 can contain, among other things, a Basic Input-Output system (BIOS) which may control basic hardware and/or software operation such as the interaction with peripheral components or devices.

Software 1235 may include code to implement aspects of the present disclosure, including code to support CSI-RS design with dynamic subframe structure. Software 1235 can be stored in a non-transitory computer-readable medium such as system memory or other memory. In some cases, the software 1235 may not be directly executable by the processor but may cause a computer (e.g., when compiled and executed) to perform functions described herein.

Transceiver 1240 may communicate bi-directionally, via one or more antennas, wired, or wireless links as described above. For example, the transceiver 1240 may represent a wireless transceiver and may communicate bi-directionally with another wireless transceiver. The transceiver 1240 may also include a modem to modulate the packets and provide the modulated packets to the antennas for transmission, and to demodulate packets received from the antennas.

In some cases, the wireless device may include a single antenna 1245. However, in some cases the device may have more than one antenna 1245, which may be capable of concurrently transmitting or receiving multiple wireless transmissions. Network communications manager 1250 may manage communications with the core network (e.g., via one or more wired backhaul links). For example, the network communications module 1250 may manage the transfer of data communications for client devices, such as one or more UEs 115.

Base station communications manager 1255 may manage communications with other base station 105, and may include a controller or scheduler for controlling communications with UEs 115 in cooperation with other base stations 105. For example, the base station communications manager 1255 may coordinate scheduling for transmissions to UEs 115 for various interference mitigation techniques such as beamforming or joint transmission. In some examples, base station communications manager 1255 may provide an X2 interface within an LTE/LTE-A wireless communication network technology to provide communication between base stations 105.

Figure 13:
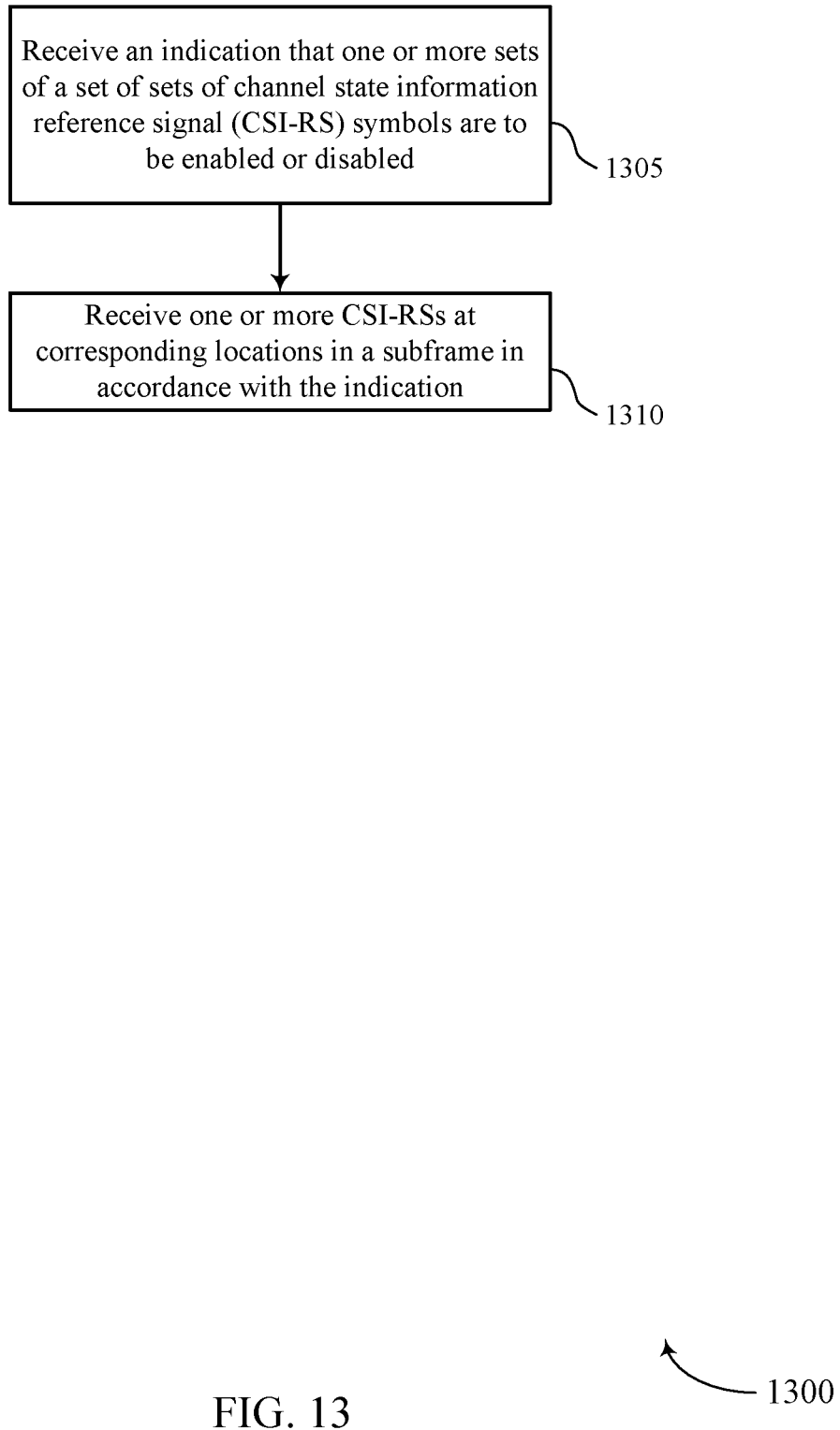
FIGS. 13 through 16 illustrate methods for CSI-RS design with dynamic subframe structure in accordance with aspects of the present disclosure.

FIG. 13 shows a flowchart illustrating a method 1300 for CSI-RS design with dynamic subframe structure in accordance with various aspects of the present disclosure. The operations of method 1300 may be implemented by a UE 115 or its components as described herein. For example, the operations of method 1300 may be performed by a UE subframe configuration manager as described with reference to FIGS. 5 through 7. In some examples, a UE 115 may execute a set of codes to control the functional elements of the device to perform the functions described below. Additionally or alternatively, the UE 115 may perform aspects the functions described below using special-purpose hardware.

At block 1305, the UE 115 may receive an indication that one or more sets of a set of sets of channel state information reference signal (CSI-RS) symbols are to be enabled or disabled. The operations of block 1305 may be performed according to the methods described with reference to FIGS. 2 through 4. In certain examples, aspects of the operations of block 1305 may be performed by a subframe configuration component as described with reference to FIGS. 5 through 7.

At block 1310, the UE 115 may receive one or more CSI-RSs at corresponding locations in a subframe in accordance with the indication. The operations of block 1310 may be performed according to the methods described with reference to FIGS. 2 through 4. In certain examples, aspects of the operations of block 1310 may be performed by a CSI-RS component as described with reference to FIGS. 5 through 7.

Figure 14:
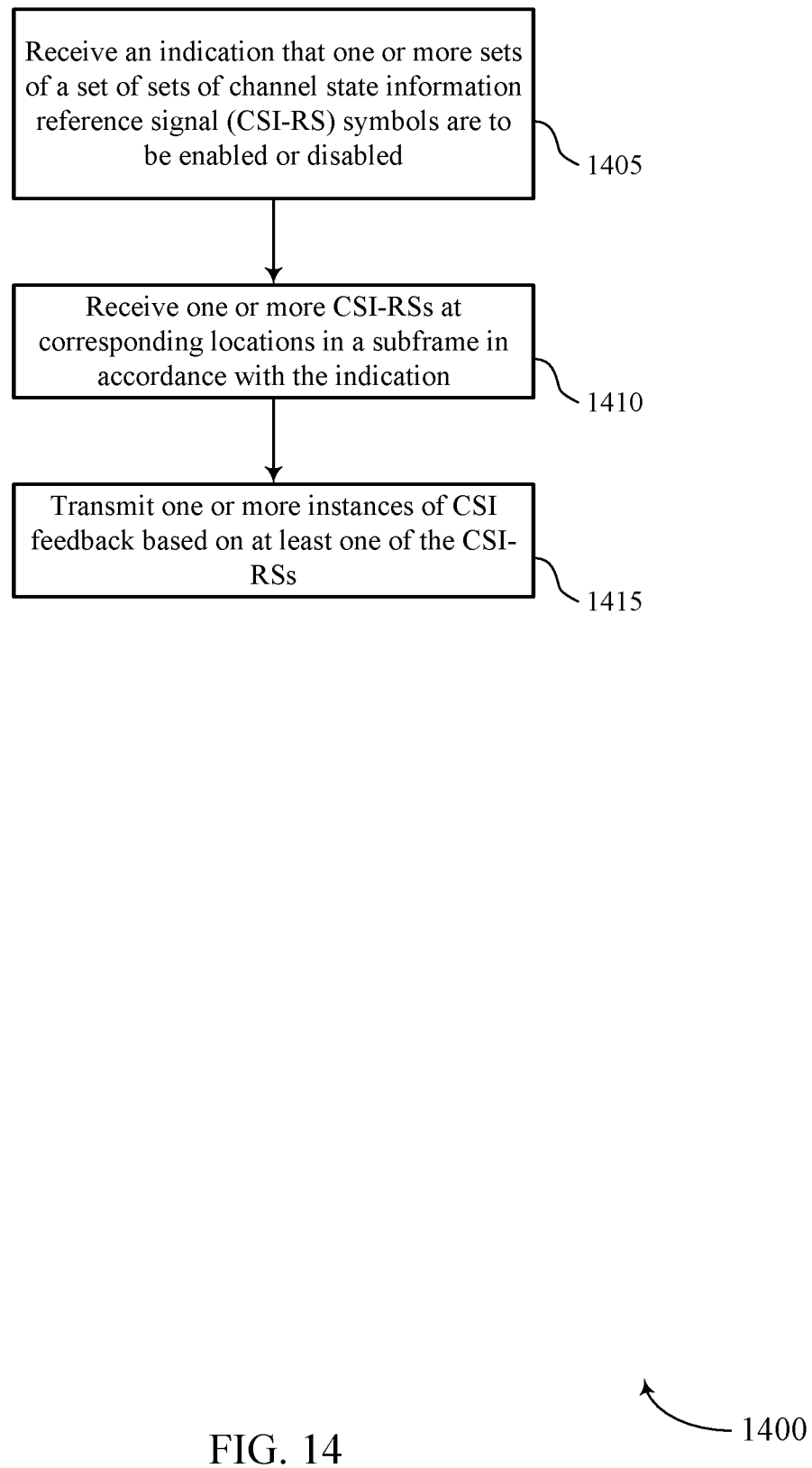

FIG. 14 shows a flowchart illustrating a method 1400 for CSI-RS design with dynamic subframe structure in accordance with various aspects of the present disclosure. The operations of method 1400 may be implemented by a UE 115 or its components as described herein. For example, the operations of method 1400 may be performed by a UE subframe configuration manager as described with reference to FIGS. 5 through 7. In some examples, a UE 115 may execute a set of codes to control the functional elements of the device to perform the functions described below. Additionally or alternatively, the UE 115 may perform aspects the functions described below using special-purpose hardware.

At block 1405, the UE 115 may receive an indication that one or more sets of a set of sets of channel state information reference signal (CSI-RS) symbols are to be enabled or disabled. The operations of block 1405 may be performed according to the methods described with reference to FIGS. 2 through 4. In certain examples, aspects of the operations of block 1405 may be performed by a subframe configuration component as described with reference to FIGS. 5 through 7.

At block 1410, the UE 115 may receive one or more CSI-RSs at corresponding locations in a subframe in accordance with the indication. The operations of block 1410 may be performed according to the methods described with reference to FIGS. 2 through 4. In certain examples, aspects of the operations of block 1410 may be performed by a CSI-RS component as described with reference to FIGS. 5 through 7.

At block 1415, the UE 115 may transmit one or more instances of CSI feedback based on at least one of the CSI-RSs. The operations of block 1415 may be performed according to the methods described with reference to FIGS. 2 through 4. In certain examples, aspects of the operations of block 1415 may be performed by a CSI feedback component as described with reference to FIGS. 5 through 7.

Figure 15:
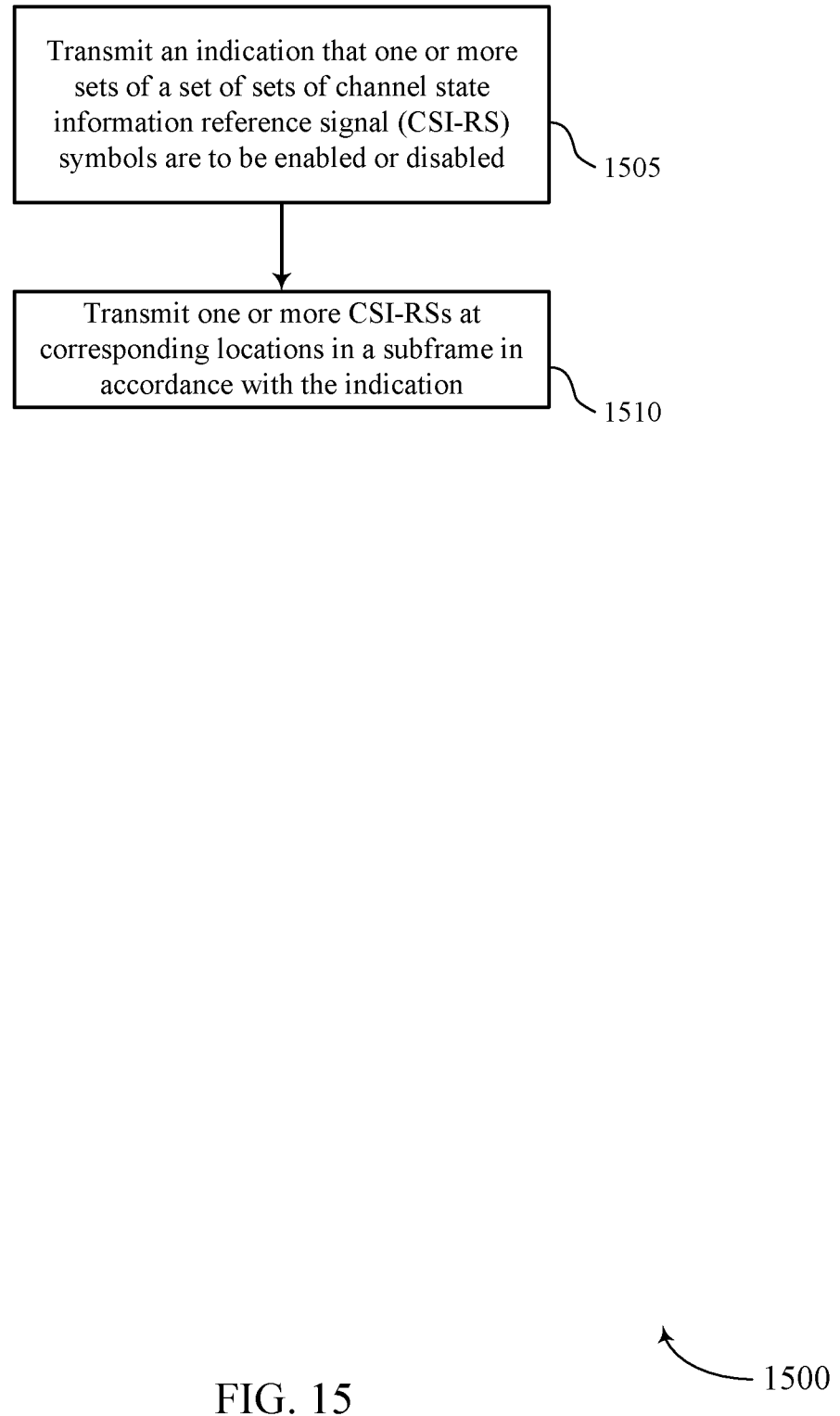

FIG. 15 shows a flowchart illustrating a method 1500 for CSI-RS design with dynamic subframe structure in accordance with various aspects of the present disclosure. The operations of method 1500 may be implemented by a base station 105 or its components as described herein. For example, the operations of method 1500 may be performed by a base station subframe configuration manager as described with reference to FIGS. 9 through 11. In some examples, a base station 105 may execute a set of codes to control the functional elements of the device to perform the functions described below. Additionally or alternatively, the base station 105 may perform aspects the functions described below using special-purpose hardware.

At block 1505, the base station 105 may transmit an indication that one or more sets of a set of sets of channel state information reference signal (CSI-RS) symbols are to be enabled or disabled. The operations of block 1505 may be performed according to the methods described with reference to FIGS. 2 through 4. In certain examples, aspects of the operations of block 1505 may be performed by a subframe configuration component as described with reference to FIGS. 9 through 11.

At block 1510, the base station 105 may transmit one or more CSI-RSs at corresponding locations in a subframe in accordance with the indication. The operations of block 1510 may be performed according to the methods described with reference to FIGS. 2 through 4. In certain examples, aspects of the operations of block 1510 may be performed by a CSI-RS component as described with reference to FIGS. 9 through 11.

Figure 16:
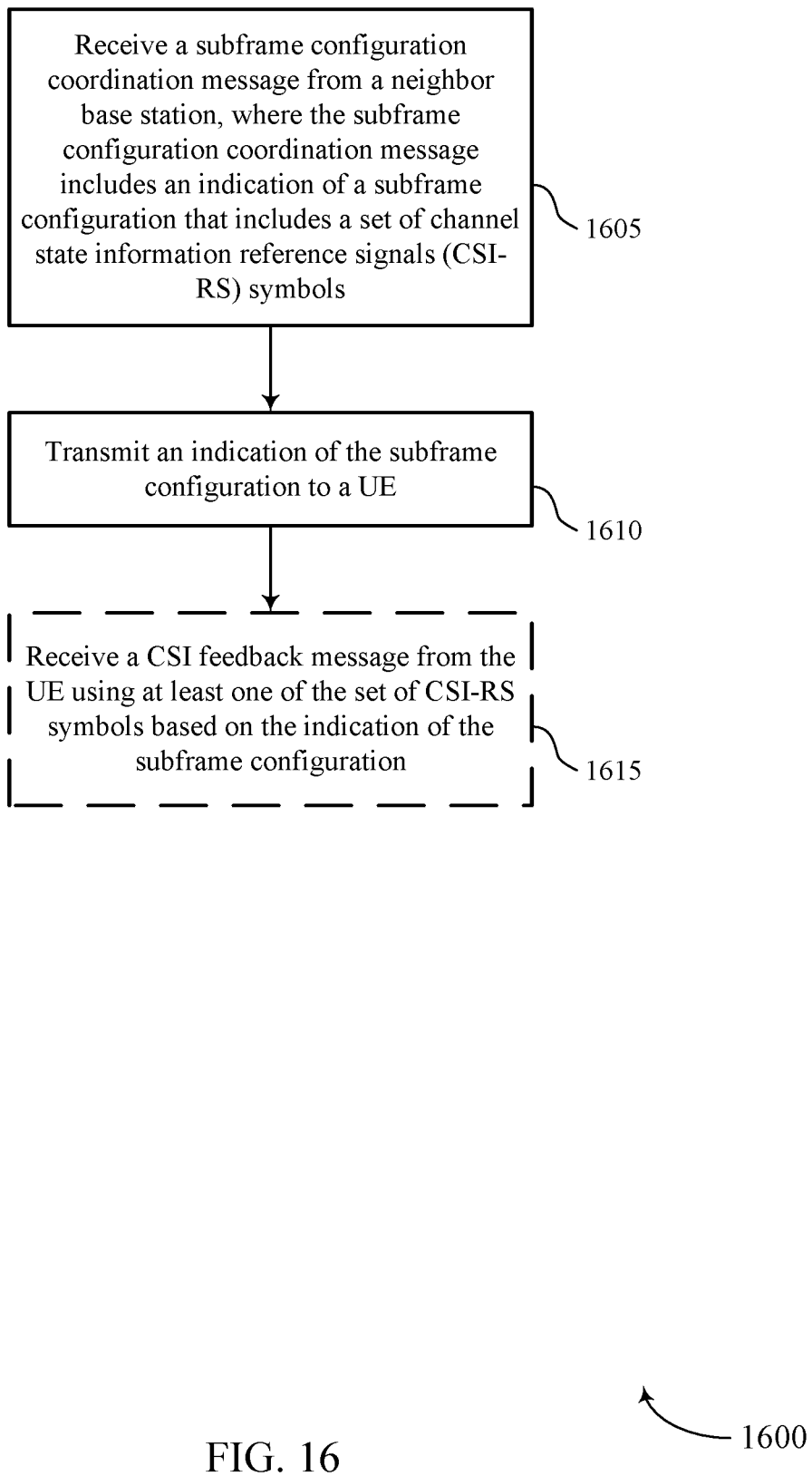

FIG. 16 shows a flowchart illustrating a method 1600 for CSI-RS design with dynamic subframe structure in accordance with various aspects of the present disclosure. The operations of method 1600 may be implemented by a base station 105 or its components as described herein. For example, the operations of method 1600 may be performed by a base station subframe configuration manager as described with reference to FIGS. 9 through 11. In some examples, a base station 105 may execute a set of codes to control the functional elements of the device to perform the functions described below. Additionally or alternatively, the base station 105 may perform aspects the functions described below using special-purpose hardware.

At block 1605, the base station 105 may receive a subframe configuration coordination message from a neighbor base station, where the subframe configuration coordination message includes an indication of a subframe configuration that includes a set of channel state information reference signals (CSI-RS) symbols. The operations of block 1605 may be performed according to the methods described with reference to FIGS. 2 through 4. In certain examples, aspects of the operations of block 1605 may be performed by a subframe coordination component as described with reference to FIGS. 9 through 11.

At block 1610, the base station 105 may transmit an indication of the subframe configuration to a UE. The operations of block 1610 may be performed according to the methods described with reference to FIGS. 2 through 4. In certain examples, aspects of the operations of block 1610 may be performed by a subframe configuration component as described with reference to FIGS. 9 through 11.

In some examples, at block 1615, the base station 105 may optionally receive a CSI feedback message from the UE using at least one of the set of CSI-RS symbols based on the indication of the subframe configuration. The operations of block 1615 may be performed according to the methods described with reference to FIGS. 2 through 4. In certain examples, aspects of the operations of block 1615 may be performed by a CSI feedback component as described with reference to FIGS. 9 through 11.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving an indication of a subframe configuration;
   canceling reception associated with at least one set of channel state information reference signal (CSI-RS) resources from a plurality of sets of CSI-RS resources based at least in part on the subframe configuration defining a symbol as an uplink symbol; and
   receiving one or more CSI-RSs at corresponding locations in a subframe in accordance with the indication.

2. The method of claim 1, wherein the one or more CSI-RSs are received in symbols of the subframe occupied by physical downlink shared channel (PDSCH) or physical uplink shared channel (PUSCH).

3. The method of claim 1, wherein receiving one or more CSI-RSs comprises receiving multiple CSI-RSs at corresponding locations in a subframe in accordance with the indication, the method further comprising:
transmitting one or more instances of CSI feedback based at least in part on the received multiple CSI-RSs.

4. The method of claim 3, wherein transmitting one or more instances of CSI feedback comprises transmitting an instance of CSI feedback corresponding to a first CSI-RS of the multiple CSI-RSs, the method further comprising:
refraining from transmitting CSI feedback corresponding to a second CSI-RS of the multiple CSI-RSs associated with the canceling the reception associated with the at least one set of CSI-RS resources.

5. The method of claim 3, wherein transmitting one or more instances of CSI feedback comprises transmitting an instance of CSI feedback corresponding to each of the multiple CSI-RSs.

6. The method of claim 3, further comprising:
receiving, by a user equipment (UE), dynamic or radio resource control (RRC) signaling from a base station indicating whether one or more instances of CSI-RS feedback are to be transmitted to the base station.

7. The method of claim 1, wherein the plurality of sets of CSI-RS resources includes resources mapped to two non-overlapping sets of CSI-RS symbols, wherein the indication indicates that one of the two non-overlapping sets of CSI-RS symbols is enabled and that another of the two non-overlapping sets of CSI-RS symbols is disabled.

8. The method of claim 1, wherein the indication indicates that a first set of CSI-RS resources of the one or more sets of CSI-RS resources comprising resources in a first symbol of the subframe is to be enabled and a second set of CSI-RS resources of the one or more sets of CSI-RS resources comprising resources in a second symbol of the subframe is to be enabled.

9. The method of claim 8, wherein the first set of CSI-RS resources comprising resources in the first symbol of the subframe corresponds to a temporal location of a data portion of the subframe.

10. The method of claim 1, wherein the indication is signaled dynamically via a control channel or is signaled via radio resource control (RRC).

11. The method of claim 1, further comprising:
transmitting one or more bits in downlink control information to convey the indication.

12. The method of claim 1, wherein the one or more CSI-RSs are received over millimeter wave (mmW) frequency resources.

13. A method for wireless communication, comprising:
transmitting an indication of a subframe configuration that indicates at least one set of channel state information reference signal (CSI-RS) resources from a plurality of sets of CSI-RS resources is to be canceled; and
transmitting one or more CSI-RSs at corresponding locations in a subframe in accordance with the indication.

14. The method of claim 13, wherein transmitting one or more CSI-RSs comprises transmitting multiple CSI-RSs at corresponding locations in a subframe in accordance with the indication, the method further comprising:
receiving one or more instances of CSI feedback based at least in part on the transmitted multiple CSI-RSs.

15. The method of claim 14, wherein receiving one or more instances of CSI feedback comprises receiving an instance of CSI feedback corresponding to a first CSI-RS of the multiple CSI-RSs and an absence of CSI feedback corresponding to a second CSI-RS of the multiple CSI-RSs based at least in part on the indication.

16. The method of claim 14, wherein receiving one or more instances of CSI feedback comprises receiving an instance of CSI feedback corresponding to each of the multiple CSI-RSs based at least in part on the indication.

17. The method of claim 14, further comprising:
transmitting, by a base station, dynamic or radio resource control (RRC) signaling to a user equipment (UE) indicating whether one or more instances of CSI-RS feedback are to be transmitted by the UE.

18. An apparatus for wireless communications, comprising:
a processor of a user equipment (UE);
a transceiver coupled with the processor; and
memory coupled with the processor, the memory and the processor configured to cause the apparatus to:
receive an indication of a subframe configuration;
cancel reception associated with at least one set that one or more sets of channel state information reference signal (CSI-RS) resources from a plurality of sets of CSI-RS resources based at least in part on the subframe configuration defining a symbol as an uplink symbol; and
receive one or more CSI-RSs at corresponding locations in a subframe in accordance with the indication.

19. The apparatus of claim 18, wherein the memory and the processor configured to receive one or more CSI-RSs are further configured to cause the apparatus to:
receive the one or more CSI-RSs in symbols of the subframe occupied by physical downlink shared channel (PDSCH) or physical uplink shared channel (PUSCH).

20. The apparatus of claim 18, wherein the memory and the processor configured to receive one or more CSI-RSs are further configured to cause the apparatus to:
receive multiple CSI-RSs at corresponding locations in a subframe in accordance with the indication, the memory and the processor further configured to cause the apparatus to:
transmit one or more instances of CSI feedback based at least in part on the received multiple CSI-RSs.

21. The apparatus of claim 20, wherein the memory and the processor configured to transmit one or more instances of CSI feedback are further configured to cause the apparatus to:
transmit an instance of CSI feedback corresponding to a first CSI-RS of the multiple CSI-RSs, the memory and the processor further configured to cause the apparatus to:
refrain from transmitting CSI feedback corresponding to a second CSI-RS of the multiple CSI-RSs associated with the canceling the reception associated with the at least one set of CSI-RS resources.

22. The apparatus of claim 20, wherein the memory and the processor configured to transmit one or more instances of CSI feedback are further configured to cause the apparatus to:
transmit an instance of CSI feedback corresponding to each of the multiple CSI-RSs.

23. The apparatus of claim 20, the memory and the processor further configured to cause the apparatus to:
receive, by the UE, dynamic or radio resource control (RRC) signaling from a base station indicating whether one or more instances of CSI-RS feedback are to be transmitted to the base station.

24. The apparatus of claim 18, wherein the plurality of sets of CSI-RS resources includes resources mapped to two non-overlapping sets of CSI-RS symbols, wherein the indication indicates that one of the two non-overlapping sets of CSI-RS symbols is enabled and that another of the two non-overlapping sets of CSI-RS symbols is disabled.

25. The apparatus of claim 18, wherein the indication indicates that a first set of CSI-RS resources of the one or more sets of CSI-RS resources comprising resources in a first symbol of the subframe is to be enabled and a second set of CSI-RS resources of the one or more sets of CSI-RS resources comprising resources in a second symbol of the subframe is to be enabled.

26. The apparatus of claim 25, wherein the first set of CSI-RS resources comprising resources in the first symbol of the subframe corresponds to a temporal location of a data portion of the subframe.

27. A apparatus for wireless communication, comprising:
a processor of a base station;
a transceiver coupled with the processor; and
memory coupled with the processor, the memory and the processor configured to cause the apparatus to:
transmit an indication of a subframe configuration that indicates at least one set of channel state information reference signal (CSI-RS) resources from a plurality of sets of CSI-RS resources is to be canceled; and
transmit one or more CSI-RSs at corresponding locations in a subframe in accordance with the indication.

28. The apparatus of claim 27, wherein the memory and the processor configured to transmit one or more CSI-RSs are further configured to cause the apparatus to:
transmit multiple CSI-RSs at corresponding locations in a subframe in accordance with the indication, the memory and the processor further configured to cause the apparatus to:
receive one or more instances of CSI feedback based at least in part on the transmitted multiple CSI-RSs.

29. The apparatus of claim 28, wherein the memory and the processor configured to receive one or more instances of CSI feedback are further configured to cause the apparatus to:
receive an instance of CSI feedback corresponding to a first CSI-RS of the multiple CSI-RSs and an absence of CSI feedback corresponding to a second CSI-RS of the multiple CSI-RSs based at least in part on the indication.

30. The apparatus of claim 28, wherein the memory and the processor configured to receive one or more instances of CSI feedback are further configured to cause the apparatus to:
receive an instance of CSI feedback corresponding to each of the multiple CSI-RSs based at least in part on the indication.

* * * * *

UNITED STATES PATENT AND TRADEMARK OFFICE
CERTIFICATE OF CORRECTION

| | |
|---|---|
| PATENT NO. | : 11,310,013 B2 |
| APPLICATION NO. | : 16/672411 |
| DATED | : April 19, 2022 |
| INVENTOR(S) | : Islam et al. |

It is certified that error appears in the above-identified patent and that said Letters Patent is hereby corrected as shown below:

In the Claims

Claim 6, Column 23, Line 23 should read:
"whether the one or more instances"

Claim 8, Column 23, Lines 32-35 should read:
"resources of the at least one set of CSI-RS resources comprising resources in a first symbol of the subframe is to be enabled and a second set of CSI-RS resources of the at least one set"

Claim 17, Column 24, Line 10 should read:
"whether the one or more instances"

Claim 23, Column 23, Lines 65-66 should read:
"whether the one or more instances"

Claim 25, Column 25, Lines 8-11 should read:
"resources of the at least one set of CSI-RS resources comprising resources in a first symbol of the subframe is to be enabled and a second set of CSI-RS resources of the at least one set"

Signed and Sealed this
Twentieth Day of December, 2022

Katherine Kelly Vidal
*Director of the United States Patent and Trademark Office*